United States Patent [19]
Bauman et al.

[11] Patent Number: 5,875,472
[45] Date of Patent: Feb. 23, 1999

[54] ADDRESS CONFLICT DETECTION SYSTEM EMPLOYING ADDRESS INDIRECTION FOR USE IN A HIGH-SPEED MULTI-PROCESSOR SYSTEM

[75] Inventors: Mitchell Anthony Bauman, Circle Pines; Donald Carl Englin, Shoreview; Donald William Mackenthun, Fridley, all of Minn.

[73] Assignee: Unisys Corporation, Blue Bell, Pa.

[21] Appl. No.: 792,685

[22] Filed: Jan. 29, 1997

[51] Int. Cl.[6] ............................. G06F 12/00; G06F 13/14
[52] U.S. Cl. ............................................. 711/150; 711/141
[58] Field of Search .................................. 711/147, 150, 711/141, 152

[56] References Cited

U.S. PATENT DOCUMENTS

| | | | |
|---|---|---|---|
| 5,623,628 | 4/1997 | Brayton et al. | 711/141 |
| 5,678,026 | 10/1997 | Vartti et al. | 711/152 |
| 5,721,855 | 7/1996 | Hinton et al. | 395/395 |
| 5,742,785 | 4/1998 | Stone | 395/393 |
| 5,802,578 | 9/1998 | Lovett | 711/147 |

*Primary Examiner*—Tod R. Swann
*Assistant Examiner*—Christopher S. Chow

*Attorney, Agent, or Firm*—Beth L. McMahon; Charles A. Johnson; Mark T. Starr

[57] ABSTRACT

An improved conflict detection system for use in maintaining memory coherency in a multiprocessor, shared-cache memory system. The system includes a queue for storing pointers to request addresses that resulted in cache misses. The addresses associated with the queued pointers will generally be presented to a main memory for processing based on a predetermined priority scheme. The system further includes conflict detection logic which uses the queue pointers and the request addresses provided by associated ones of the processors to determine if any two of the queued requests are associated with the same request address. If so, a conflict exists, and the request queue later in time must be re-directed to cache instead of being presented to main memory to maintain cache coherency. The system further includes a mechanism for using pointers to detect conflict situations associated with flush and replacement cache operations. Because the conflict detection system queues pointers to addresses, instead of the addresses themselves, a large amount of silicon area can be saved. In addition, the system performs all conflict detection operations using full address compares to eliminate the detection of false conflicts.

21 Claims, 14 Drawing Sheets

| Fig. 2A | Fig. 2B |

POINTER CONTROL

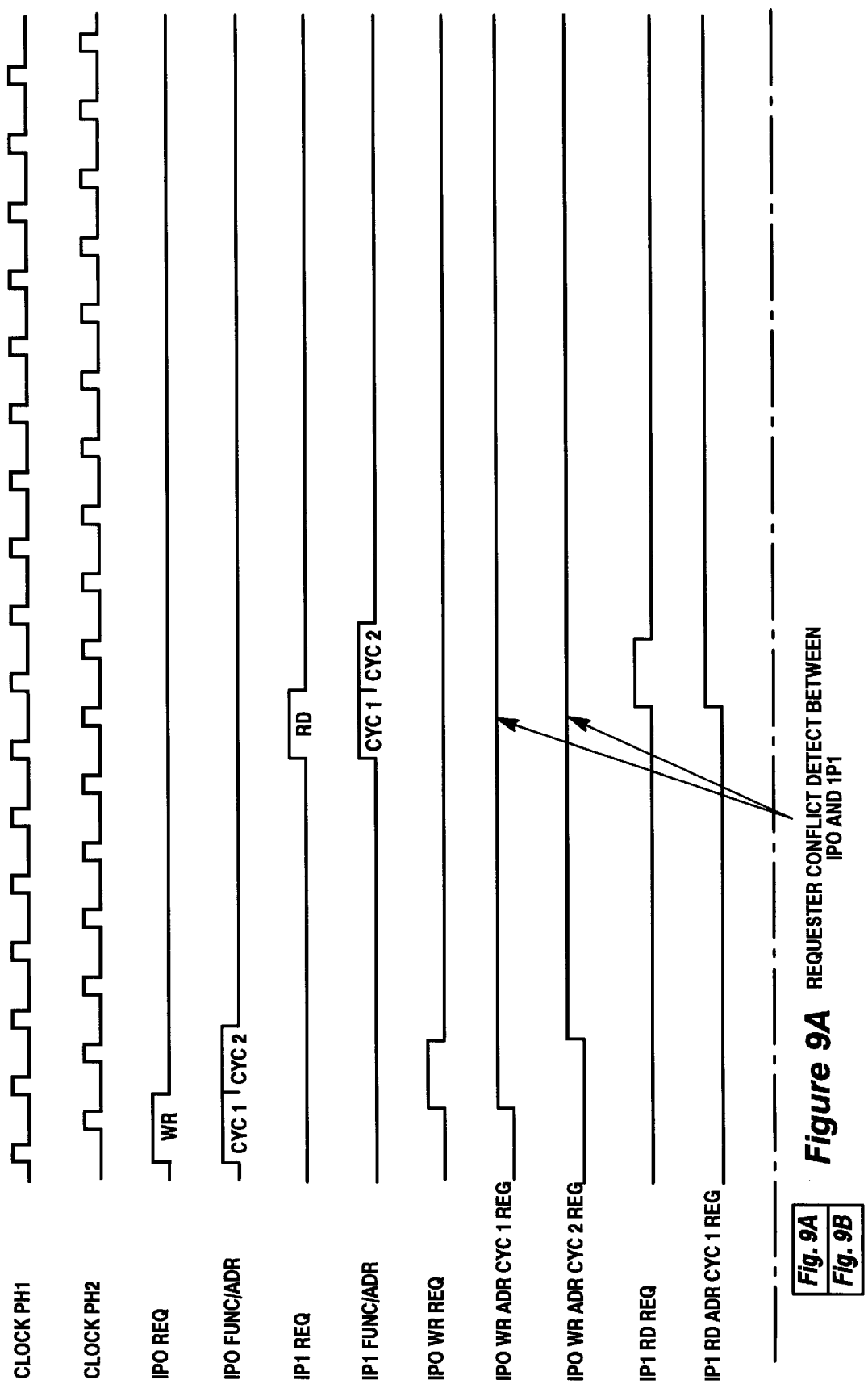

ADDRESS CONFLICT DETECTION SYSTEM EMPLOYING ADDRESS INDIRECTION FOR USE IN A HIGH-SPEED MULTI-PROCESSOR SYSTEM

BACKGROUND

1. Field of the Invention

The invention relates to an improved system and method for performing address conflict detection in a multi-processor system in which multiple processors make memory requests to a single shared cache memory; and, more particularly, to a system and method for performing address conflict detection and resolution on the memory request address signals using address indirection.

2. Description of the Prior Art

Many data processing systems have multiple processors coupled to the same shared memory. Such systems must employ coherency schemes, as are well known in the art. Coherency schemes ensure that updates made to memory because of the activities of one processor are made available to the other coupled processors so that all processors in the system are working from the same (latest) copy of the signals stored in memory.

Special memory coherency considerations must be made in systems in which multiple processors are coupled to a shared cache memory, which is, in turn, coupled to another memory at a next lower level in the memory hierarchy. This "lower-level" memory could be another level of cache or a main memory, but for convenience sake, it will be referred to as a "main memory". In such systems, a processor generally makes memory requests to the shared cache memory first. If a cache hit results, the requesting processor is provided access to the cache. If a cache miss results, that request is queued along with other requests that resulted in cache misses. The queued request is then presented to the main memory according to a predetermined priority scheme.

Sometimes the above-described procedure can not be followed because an "address conflict" occurs. An address conflict occurs when two requests are made to the same address within some close proximity in time. The first request is handled according to the general procedure, but the "effects" of this first request on memory are not completed by the time the second request is selected for processing. The second request must be delayed to allow the first request to complete. Otherwise, the memory may return an old copy of the data signals, or may return data signals which are partly old, and partly new, that is, the data signals are inconsistent. Both of these cases cause improper system operation. This concept can best be explained by example. Assume a first processor makes a write request to an address in a shared cache memory at approximately the same time a second processor makes a read request to the same address in the cache memory. Based on a predetermined priority scheme, the first processor's request is handled first and results in a cache miss. The write request address that resulted in a cache miss is therefore entered in a memory queue so that the request can be presented to main memory and the requested data signals may be returned to the cache. While the first write request is still queued to main memory, the second processor's read request is presented to the cache. Again, the address results in a cache miss, and the second read request address is added to the queue to wait for main memory access. When the first write request is presented to main memory and the requested data signals are returned from main memory and written to the cache, a replacement operation occurs. The write operation is then completed when updates are written to the replaced data signals in cache.

When the second read request address is retrieved from the queue for processing, it would generally be presented to main memory. However, assuming the cache in this case is not a store-through cache, and updates are therefore not copied back to main memory until a flush operation occurs, presenting the read request address to main memory would result in retrieval of an older copy of the data which will overwrite the newer copy in cache. Therefore, the read request address should be presented to the cache memory instead of to the main memory. Detecting and properly handling this type of situation is called conflict detection and resolution.

The above example illustrates perhaps the most simple example of an address conflict. Cache replacement and cache flush operations can also give rise to address conflict situations. A cache replacement is the operation that occurs when data signals from the main memory are copied back to the cache after a cache miss results. A cache flush is the operation that occurs prior to the replacement operation to make room for the data signals which will be written to cache during the replacement operation. During a cache flush operation, any updated data signals which will be overwritten during the replacement operation must be copied back to the main memory so the main memory has the latest copy of these data signals. The address in main memory from which the data signals are retrieved prior to a replacement operation is called the replacement address, and the address to which the data signals will be copied in main memory during a flush operation is called the flush address.

Both replacement and flush operations can be delayed in a manner to be discussed further below. As a result, a cache flush or replacement operation associated with a previous request may not have completed when a subsequent unrelated request to either the replacement or flush address is presented to cache. To maintain cache coherency in this situation, the new request must be marked as a conflict regardless of whether a cache hit or miss occurs.

Finally, conflict situations can arise in high-speed cache systems which allow requests to be interleaved in a manner to be described further below. In such systems, a first cache write request interleaved with a second cache read request to the same address can result in incoherent results. If the first cache write operation is not allowed to complete, the interleaved cache read request will receive "old" data signals. To prevent this situation, the subsequent cache read request must be marked as a conflict so that it is not presented to cache immediately.

In all of the above situations, cache coherency is maintained through the use of a conflict detection and resolution system. Prior art conflict detection and resolution schemes manipulate queued addresses to determine the presence of a conflict. When a request to cache results in a cache miss, the full address associated with the request is added to a memory queue to await presentation to the main memory. After the address is added to the queue, the address is compared to the addresses of all other requests that are also present in the queue. If a favorable compare exists, the newly queued address is tagged as a conflict. When finally removed from the queue for processing, addresses that are tagged as conflicts are re-directed back to the cache instead of being presented to main memory.

Prior art conflict detection systems have several disadvantages. First, they are relatively intensive in the use of circuitry (logic) because full request addresses are entered in the memory queue to await presentation to main memory. In large data processing systems, memory addresses may include thirty or more bits. Therefore, the large number of logic circuits needed to implement the memory queue consumes large area of silicon on a custom or semi-custom integrated logic device.

Another disadvantage associated with prior art conflict detection systems involves the use of partial-address compares where the conflict detection is not performed on all bits of the address. When a new request address is added to the memory queue, only a predetermined subset of address bits from the request address is compared with a similar subset of the address bits associated with every other entry in the queue. If a favorable compare results, the newly-entered request address is marked as a conflict. The use of partial-address compares allows the conflict detection logic to be implemented using fewer logic circuits and results in use of less silicon area. However, it can result in two different request addresses being detected as "conflicts" when, in fact, only the predetermined subset of address bits actually compare. As a result, when the "conflicting" request address is removed from the queue for processing, it will be erroneously presented again to the cache where it will again result in a cache miss. The request address must be re-entered into the memory queue to await presentation to the memory interface. This detection of "false", or "noise", conflicts decreases system throughput.

Finally, in prior art large-scale data processing systems, queue size limits system throughput. As discussed above, the memory queues are "silicon intensive" because each queue entry must store an entire memory address. In the interest of limiting the silicon area occupied by the memory queues, the number of entries within the queue are limited to a number which is considerably less than that required to store addresses for all of the memory requests that could potentially be pending simultaneously. When the queue is full, no more requests can be presented to cache because if a cache miss occurs, the queue can not store the additional request. Thus, even though some requesters do not have requests pending to main memory, and these requesters are making requests that would result in cache hits, these requests can not be processed. When the memory queue is full, all memory access to the cache will cease. This significantly diminishes system throughput.

The conflict detection and resolution system of the present invention solves the above-identified problems. The system takes advantage of the fact that each request address must be stored somewhere before it can be presented to cache. Assuming a requesting processor and the cache are implemented in separate integrated circuit chips, the request addresses are generally stored in input buffer circuits. Therefore, a copy of a request address need not be stored in the memory queue following a cache miss. Instead, a pointer to the associated input buffer circuit can be stored in the memory queue. This dramatically reduces the amount of silicon area consumed by the queue logic. Because the pointers are so much smaller than each of the memory addresses, the number of queue entries can be increased so that one queue entry is provided for every request that could potentially be pending to main memory simultaneously. This allows the cache to continue processing requests as long as there are some requesters which do not yet have requests queued and waiting for main memory access. Finally, the current invention provides full address compare capability so that "noise" conflicts are eliminated. The improved conflict detection and resolution system provides conflict detection for each of the conflict situations described above while improving overall system throughput.

SUMMARY OF THE INVENTION

It is a primary object of the current invention to provide an improved address conflict detection and resolution system for a multiple processor data processing system;

It is a further object to provide an address conflict detection and resolution system that performs conflict detection by manipulating pointers to request addresses instead by manipulating the request addresses themselves;

It is another object to provide an address conflict detection and resolution system that performs full-address compares to detect conflicts;

It is yet a further object to provide an address conflict detection and resolution system that allows each requester in the system to have a first predetermined number of read requests and a second predetermined number of write requests pending simultaneously to main memory at any given time;

It is a yet another object to provide an address conflict detection and resolution system that allows each requester in the system to continue making read requests to cache as long as a first predetermined number of read requests are not pending from that requester to main memory, and to further continue making write requests to cache as long as a second predetermined number of write requests are not pending from that requester to main memory;

It is a further object to provide an address conflict detection and resolution system that uses address pointers to resolve conflicts associated with cache flush operations;

It is yet another object to provide an address conflict detection and resolution system that uses address pointers to resolve conflicts associated with cache replacement operations; and It is still a further object to provide an address conflict detection and resolution system that uses address pointers to resolve conflicts associated with two interleaved requests to cache memory.

These and other objects are attained in an improved conflict detection and resolution system. The conflict detection and resolution system of the present invention performs conflict detection by manipulating pointers to request addresses, where the request addresses are stored elsewhere in the system. Pointers to addresses, instead of addresses themselves, are stored in a pointer queue, which vastly reduces the size of each queue entry. As a result, the number of queue entries may be increased so that one entry exists for every request which may be pending simultaneously within the system. This allows the cache memory to continue processing requests as they are made, that is, until each and every requester is waiting for access to main memory. System throughput is therefore dramatically improved. Finally, because of the vast reduction in the size of each queue entry, a large amount of logic circuitry and silicon area is conserved. This area can be devoted to compare logic circuitry which performs full-address compares. By performing full-address compares on all addresses added to the pointer queue, false conflicts are eliminated, and system throughput is increased.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded, to the extent of applicable law, as illustrative in nature and not as restrictive.

BRIEF DESCRIPTION OF THE DRAWINGS

FIGS. 9A and 9B are a timing diagram showing replacement conflict detection and resolution when an IP1 read request is made to the replacement address;

A. PRIOR ART

Figure 1:
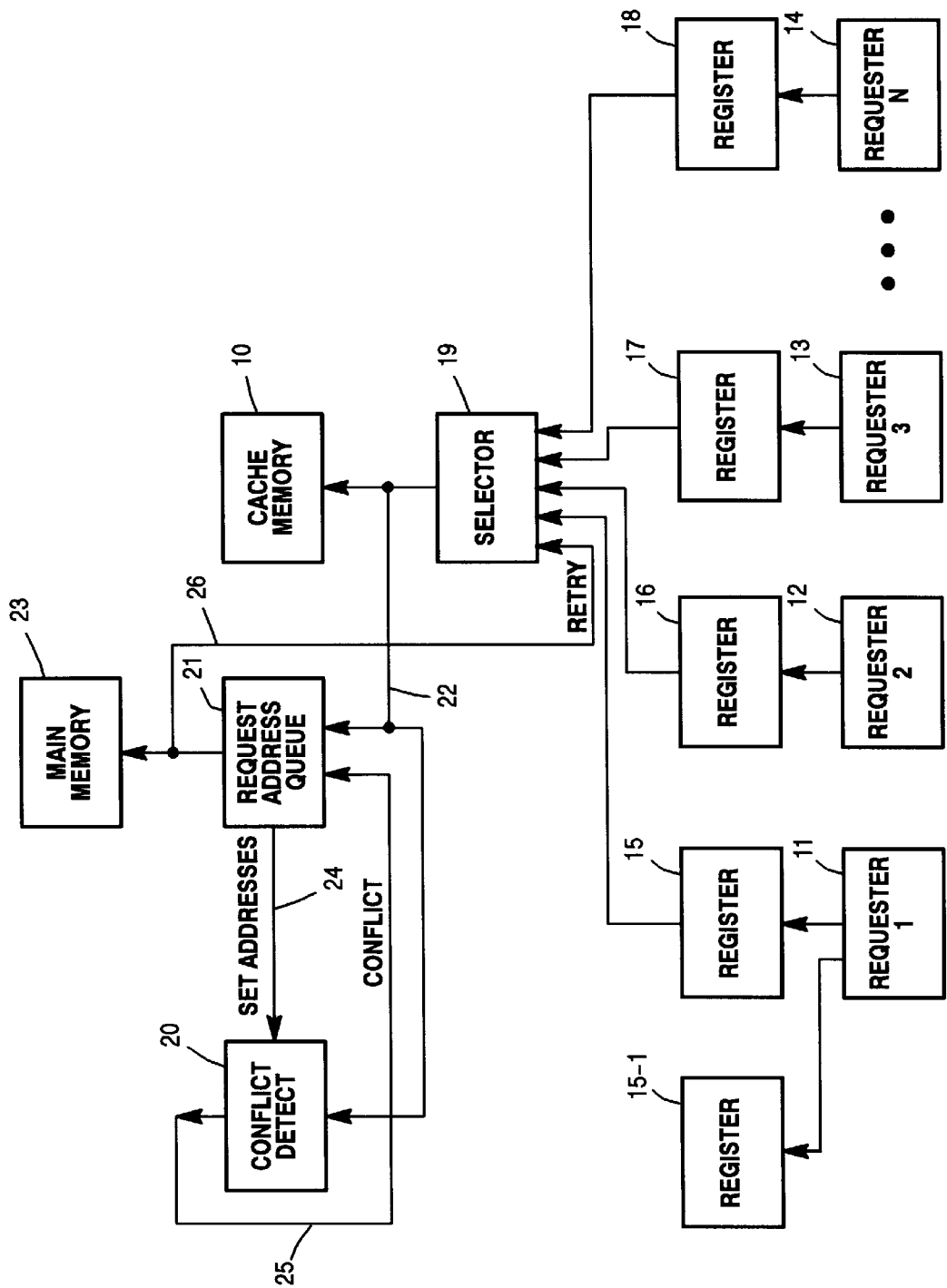
FIG. 1 is a schematic block diagram of a prior art conflict detection and resolution system.

FIG. 1 is a schematic block diagram of a prior art conflict detection and resolution system. Requests to cache memory 10 are made by a plurality of requesters shown as requester 1 labeled 11, requester 2 labeled 12, requester 3 labeled 13, and requester N labeled 14. Each of requesters makes requests by providing request address signals to associated input registers 15, 16, 17, and 18, respectively, where the signals are latched and presented to the cache memory 10. Each requester could be associated with a plurality of request registers. For example, requester 1 could have one register 15-1 for latching read request address signals, and a second register 15 for latching write request address signals.

The circuit of FIG. 1 can best be understood be example. Assume that two requests are made to cache memory 10 simultaneously. The first is a request to perform a write operation to address A1 from requester 1 labeled 11, and the second is a request to perform a read operation to address A1 from requester 2 labeled 12. The address A1 is therefore latched into both registers 15 and 16. Based on a predetermined priority scheme, the write address A1 from register 15 is selected by selector 19 and provided to the cache memory 10. Assume the request results in a cache miss, and write address A1 is presented to both the conflict detect circuit 20 and the request address queue 21 on line 22. The conflict detect circuit 20 performs conflict detection on write address A1 in a manner to be described below. The write address A1 is then stored into the request address queue 21 to await presentation to the main memory 23. Next, assume read address A1 is selected by selector 19 from register 16, provided to cache memory 10, and again results in a cache miss. This read request address will be presented to conflict detect circuit 20 so that conflict detection can be performed.

As discussed above, conflict detection must be performed to detect the presence of two queued requests that are requesting access to the same address in memory. The latter request must be tagged as a conflict so that when it is removed from the request address queue 21 for processing, it can be re-directed to the cache memory 10 instead of the main memory 23. Otherwise, this latter read request will cause cached updates made by the prior write request to be overwritten by the data signals retrieved from main memory 23.

Returning to the current example, the prior art conflict detection system of FIG. 1 receives the read address A1 from requester 2 on line 22. This read address A1 is compared with address signals provided on line 24 by the request address queue 21. Line 24 provides a subset of the address signals associated with each of the request addresses stored in the request address queue 21. The subset of address signals used in the prior art is called the set address, which is also the subset of address signals used to address the cache memory 10, which is set-associative addressable. If the set address from the current request address compares favorably to the set address signals associated with any of the other request addresses, a conflict indicator is provided on line 25 to the request address queue 21 so that the current request is marked as a conflict when it is added to the request address queue. In the current example, the set address of address A1 from requester 2 compares favorably to the set address of address A1 from requester 1, and is therefore marked as a conflict by the signal provided on line 25. Write address A1 from requester 1 will eventually be removed from the request address queue 21 and provided to the main memory 23 so that the data signals from address A1 can be returned to the cache memory 10 on a data path (not shown) from main memory. Subsequently, address A1 from requester 2 will be removed from the request address queue 21 for processing. Because it is marked as a conflict, however, the address will be re-directed on line 26 back to the cache memory 10 as a retry address, where it now results in a cache hit.

The above example illustrates the most simple case of conflict detection and resolution involving two requests to the same address that both resulted in cache misses. Prior art circuits also perform conflict detection in other situations, including those involving cache replacement and cache flush operations. A cache replacement operation is a function that occurs after a cache request results in a miss. Eventually, this request will be provided to the main memory 23, and the requested data signals will be returned to cache memory 10. This new data from the requested address in the main memory is stored into cache memory 10 during a replacement operation. The address from which the data signals were retrieved in main memory 23 is called the replacement address. If the data signals which will be overwritten by the new replacement data have been updated since being cached, the data signals to be overwritten must be written back to main memory 23 during a flush operation. The flush operation provides main memory with the latest copy of the data signals. The address in main memory to which these data signals will be written is called the flush address.

Both replacement and flush operations can be delayed in a manner to be discussed further. As a result, a cache flush or cache replacement operation associated with a previous request may not have completed when a subsequent unrelated request to either the replacement or flush address is presented to cache memory 10. To maintain cache coherency in this situation, the new request must be marked as a conflict regardless of whether a cache hit or miss occurs. Prior art conflict detect logic 20 performs this conflict detection by receiving the set addresses of the replacement and flush addresses from the cache memory 10 on associated address paths (not shown). These set addresses are each compared to the set address signals from the current request address received on line 22. If a favorable compare results, the request address is added to the request address queue 21 and marked as a conflict. Again, prior art conflict detect logic only performs these compare operations using set addresses.

The request address queue 21 in the prior art system stores memory addresses, which, in many large data processing systems, may include thirty or more address signals. Therefore, each entry in the queue must be relatively large, and the queue structure requires are large amount of logic circuits and silicon area when implemented on a custom or semi-custom integrated logic device.

Another problem associated with prior art systems such as that shown in FIG. 1 involves the detection of "false" conflicts. The prior art systems detect conflicts by comparing the set address signals only. As a result, the set address associated with a current request may favorably compare to the set address of one of the addresses stored in the queue, so that the current request is tagged as a conflict even though the total address signals do not compare. The address associated with this "false" conflict must then be re-presented to the cache memory 10 where it again results in a cache miss. The address must be re-entered in the request address queue 21 to again wait presentation to the main memory 23. This wastes time and slows down throughput in situations that do not truly involve conflicts.

Finally, prior art systems such as the one illustrated in FIG. 1 result in dramatically reduced system throughput because the number of queue entries is far fewer than necessary to accommodate all requests that could be pending simultaneously in the system. For example, assume the request address queue 21 can store only two addresses, and that each of the four requesters has a request address pending to cache memory 10. Assume the requests for requester 1 and requester 2 have been submitted to the cache memory 10. Both requests resulted in cache misses so that the associated request addresses have been entered into the request address queue 21 and the request address queue is now full. As a result, the pending requests from requester 3 and requester N can not be presented to the cache memory 10 because the request address queue 21 can not store another address should the request result in a cache miss. Thus, even though the requests from requester 3 and requester N could result in cache hits, they can not be processed until one of the addresses is removed from the request address queue 21. This reduces system throughput. The improved request queue and conflict detection system of the current invention solves these problems in a manner to be discussed further below.

B. SYSTEM ENVIRONMENT OF THE IMPROVED CONFLICT DETECTION AND RESOLUTION SYSTEM

Figure 2A:
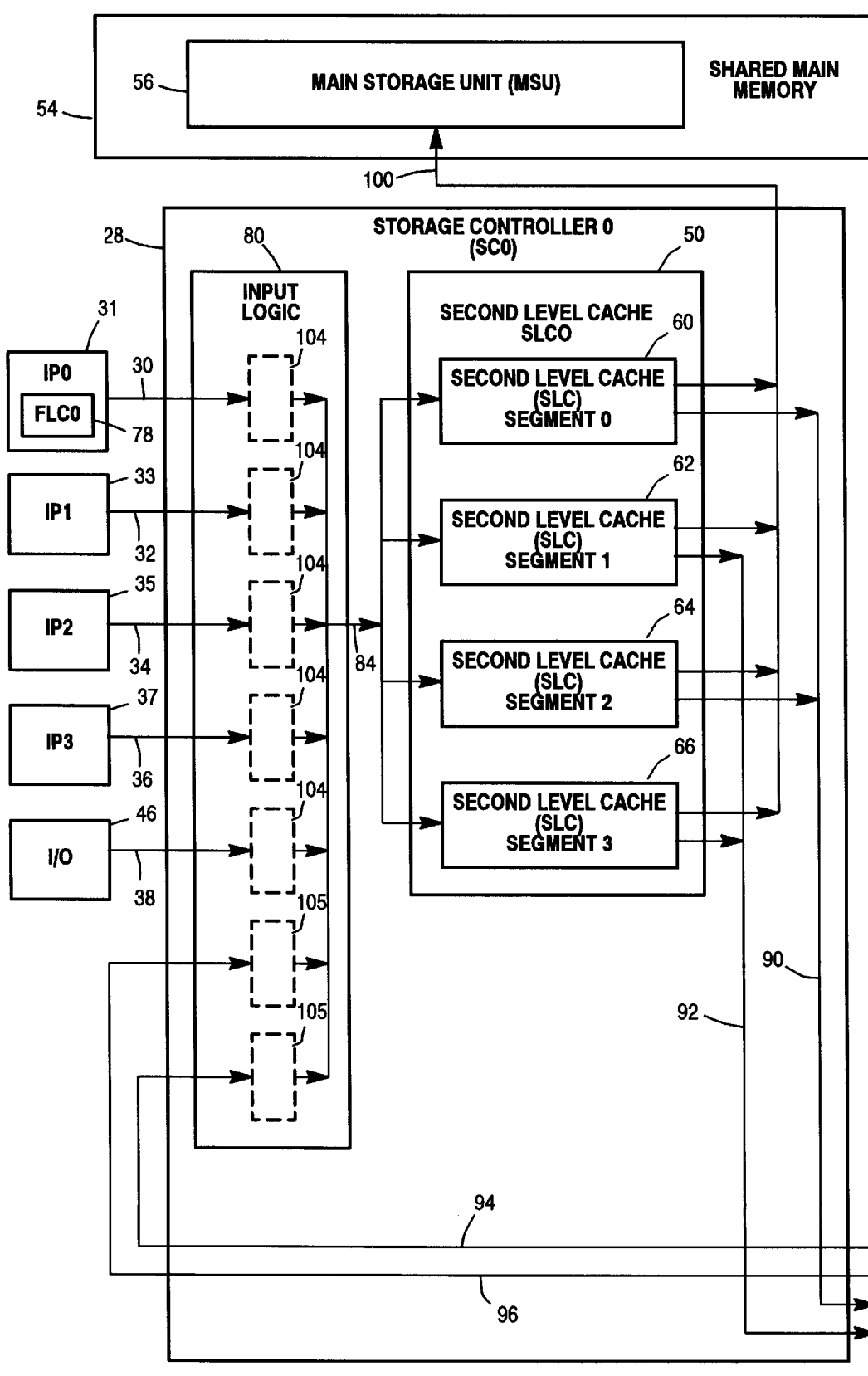
FIGS. 2A and 2B, when arranged as shown in FIG. 2, are a schematic block diagram of the multi-processor data processing system in which the present invention is embodied.
Figure 2B:
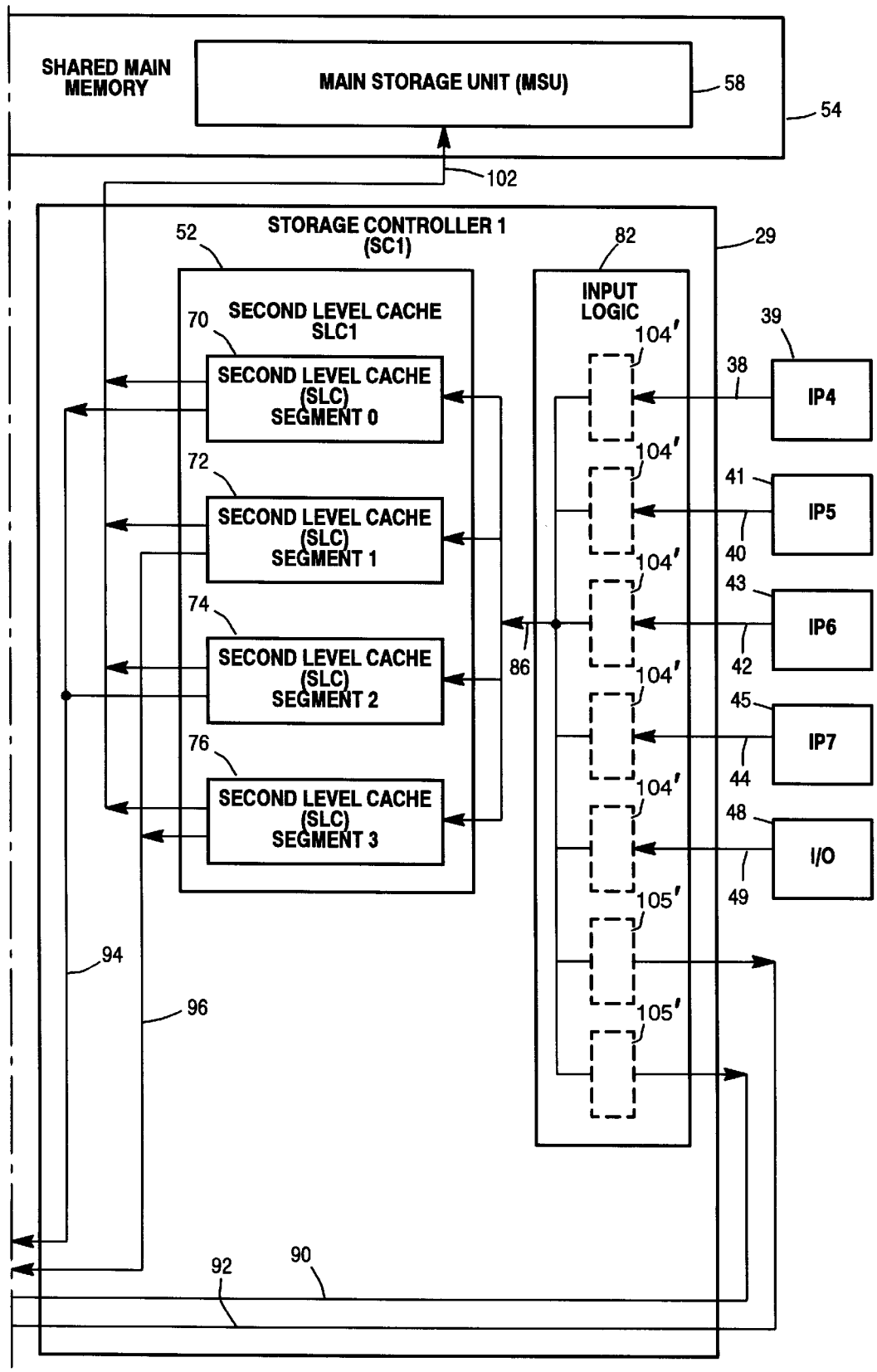

FIGS. 2A and 2B, when arranged as shown in FIG. 2, are a block diagram of the multiprocessor data processing system in which the present invention is embodied. The system of FIG. 2 has two storage controllers (SCs), SC0 28 and SC1 29. Each of the storage controllers is coupled to four instruction processors (IP)s. Lines 30, 32, 34, and 36 illustrate the respective point-to-point couplings between the instruction processors IP0 31, IP1 33, IP2 35, IP3 37 and SC0 28. Lines 30, 32, 34, and 36 represent IP/SC interfaces, which are each a collection of function, data, and address lines between the respective IP and the SC0 28. Lines 38, 40, 42, and 44 represent similar IP/SC interfaces between SC1 29 and IP4 39, IP5 41, IP6 43, and IP7 45, respectively. Each of the SCs 28 and 29 are further coupled to input/output units (I/Os) 46 and 48, respectively, across IO/SC interfaces 47 and 49, respectively.

Each of the storage controllers SC0 28 and SC1 29 has an associated global second-level cache SLC0 labeled 50 and SLC1 labeled 52, respectively. The global SLCs are described as "global" because each is mapable to the all of system's addressable memory included in shared main memory 54. That is, the entire address range of the addressable memory is cacheable by each of the global SLCs. The shared main memory 54 is comprised of two memory subsystems, memory storage units (MSUs) 56 and 58.

SC0 28 and global SLC0 50 are "local" relative to IP0 31, IP1 33, IP2 35, and IP3 37, and are "remote" relative to IP4 39, IP5 41, IP6 43, and IP7 45. Similarly, SC1 29 and global SLC1 52 are "local" relative to IP4 39, IP5 41, IP6 43, and IP7 45, and are "remote" relative to IP0 31, IP1 33, IP2 35, and IP3 37. The global SLCs may be viewed as dedicated to the requests of their respective local IPs and cooperating in servicing requests from the remote IPs. Global SLC0 50 is dedicated to IP0 31, IP1 33, IP2 35, and IP3 37 in that the SLC0 storage is dedicated to caching data based on requests from IP0, IP1, IP2, and IP3. Similarly, global SLC1 52 is dedicated to IP4 39, IP5 41, IP6 43, and IP7 45 in that the SLC1 storage is dedicated to caching data based on requests from IP4, IP5, IP6, and IP7.

Each of the SLCs 50 and 52 is comprised of four independently controlled second-level cache memory segments referred to as segment 0, segment 1, segment 2, and segment 3. These segments are labeled 60, 62, 64 and 66, respectively, in SLC0 50, and labeled 70, 72, 74, and 76, respectively, in SLC1 52. Generally, each of segment 0, segment 1, segment 2, and segment 3 in each of the SLCs maps to one-fourth of the shared main memory 54. It will be understood that each of the SLCs could be partitioned to include either fewer segments, or more segments, than the number included in the system of the preferred embodiment.

In addition to the second-level caches 50 and 52, the multiprocessor system of FIG. 2 also includes dedicated first-level caches (FLCs) associated with each of the instruction processors. The first-level cache FLC0 labeled 78 associated with IP0 31 is shown for exemplary purposes.

During execution, an IP will generally attempt to retrieve data signals (either representing instructions or operands) from its associated first-level cache. If the requested data signals are not present in the first-level cache, the IP forwards the request address to its local SC across its associated IP/SC interface. The request address and associated function signals, which indicated whether the request is a read or a write, are latched into a respective input circuit 104 (shown dashed) in the local SC's input logic circuits. SC0's 28 input logic circuit 80 includes an input circuit 104 associated each of the local units IP0, IP1, IP2, and IP3 and I/O unit 46. SC1's 29 input logic circuit 82 includes an input circuit 104' associated each of the local units IP4, IP5, IP6, and IP7 and I/O unit 48.

After the request address is latched into a respective input circuit in the local SC, the latched request address is provided to the appropriate local segments 0, 1, 2, and 3 across an address/control interface shown as line 84 in SC0 and line 86 in SC1. Segment selection logic (not shown) within each input circuit 104 and 104' determines which local cache segment should receive the request. As discussed above, each cache segment maps to one-fourth of the global main memory 54. The address/control interfaces shown on lines 84 and 86 are cross-bar interfaces that connect the input circuits 104 of each of the local IPs and the I/O unit with each of the local segments. Therefore, each of lines 84 and 86 represent multiple address and control interfaces, as will be described further below.

After the request address is received by the appropriate segment, associated control logic (not shown) determines whether a cache hit occurred. If a hit occurred, the requested operation, either a read or a write, is performed. If a cache miss occurred in the local cache segment, an attempt is made to retrieve the requested data signals from the associated remote cache segment. This is done using one of two remote interfaces. Following a cache miss to either local segment 0 60 or local segment 2 64, the remote 0/2 interface 90 provides addresses to the remote cache segment 0 70 and remote cache segment 2 74, respectively. If a cache miss instead occurs to either local segment 1 62 or local segment 3 66, the remote 1/3 interface 92 provides addresses to the remote cache segment 0 72 and remote cache segment 2 76, respectively. Similar remote interfaces exist in SC1. If a request from one of IP4, IP5, IP6, and IP7 results in a cache miss to a local SC1 segment 0 70 or segment 2 74, a request is made to remote SC0 28 over the remote 0/2 interface 94. If the local cache miss instead was to segment 1 72 or segment 3 76 of SC1, a request is made to SC0 28 over the remote 1/3 interface 96.

When the request is made to the remote SC over one of the remote interfaces, the request address and associated function bits are latched into an associated remote input circuits 105 and 105' (shown dashed) included in the respective input logic circuits 80 and 82. The remote input circuits 105 and 105' are similar to the input circuits 104 and 104' used to latch request addresses from the local IPs or I/O unit, and will be discussed further below. As is the case with a request address provided by input circuits 104 and 104', segment selection logic circuits (not shown) within the remote input circuits 105 and 105' determines which local cache segment should receive the request from the remote SC based on the request address. The request address will be provided to the selected segment, where it will either result in a cache hit or a miss. If a cache hit results, the data signals at the request address are returned to the respective segment in the local SC for use by the requesting IP or I/O unit. If a cache miss results, the requested data signals must be retrieved from the shared main memory 54. Segments local to SC0 28 retrieve data signals from shared main memory 54 using the interface on line 100, and segments local to SC1 29 retrieve data signals from shared main memory 54 using the interface on line 102.

Figure 3:
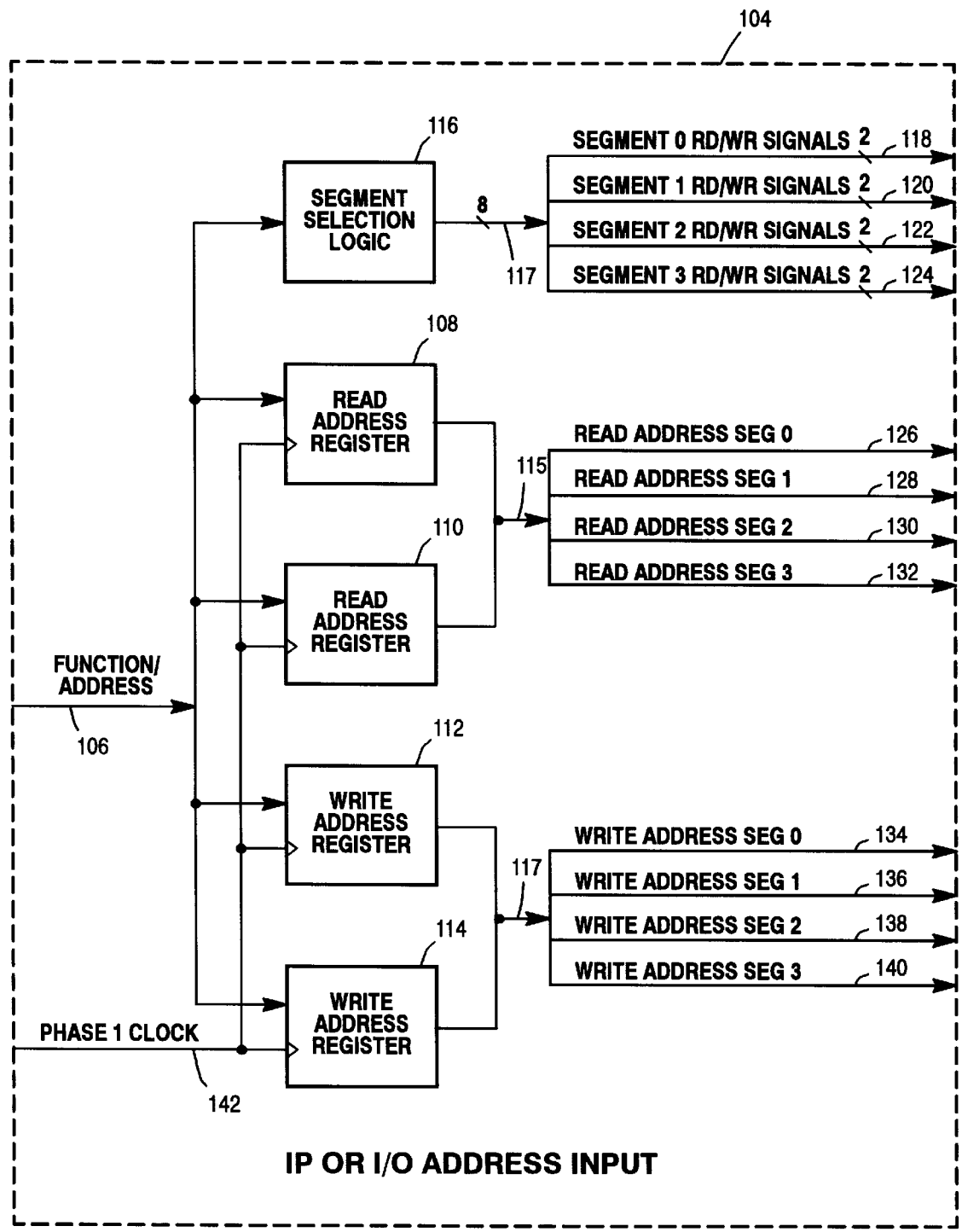
FIG. 3 is a schematic logic diagram of the input circuit associated with each instruction processor and each input/output unit of FIG. 2.

FIG. 3 is a schematic logic diagram of each of the input circuits 104 and 104' (shown dashed) of FIG. 2. Each input circuit is used to latch address and function signals when a request is made from an IP or I/O unit to the local SC. For example, referring back to FIG. 2, during a request from IP0 31 to SC0 28, the request address, function, and data signals (during a write request) are provided to the associated input circuit 104 of FIG. 2 across the associated IP/SC interface shown on line 30. Within the input circuit 104, the function and address signals are provided on line 106 to read address registers 108 and 110, and write address registers 112 and 114. The request address signals are latched into read address registers 108 and 110 if the function signals indicate a read request is being performed.

In addition to being latched into appropriate ones of the registers based on the function signals, the request address is provided to the segment selection logic circuit 116. The segment selection logic circuit 116 maps the address into one of the segments 0, 1, 2, or 3, then generates either a read request signal or a write request signals for the appropriate segment. These signals are shown collectively on line 117. The respective ones of the read request and the write request signals are routed to the associated segments 0, 1, 2, and 3 on lines 118, 120, 122, and 124. For example, during a write request to segment 0 60, the segment 0 write request signal shown on line 118 is driven active to segment 0. Likewise, during a read request to segment 1 62, the segment 1 read request signal shown on line 120 is driven active to segment 1. The segment 0, 1, 2, and 3 read/write signals allow the selected segment to receive the latched read or write address signals provided by registers 108 and 110, or registers 112 and 114, respectively, in a manner which will be discussed further below.

As discussed above, two registers are associated with the read address, and two registers are associated with the write address. The most significant bits of the read address are latched into read address register 108 and the least significant bits of the read address are latched into read address register 1 10. The entire latched read address is driven by both read address registers 108 and 110 onto line 115, and provided to each of segment 0 60, segment 1 62, segment 2 64, and segment 3 66 on lines 126, 128, 130, and 132, respectively.

In a similar manner to that discussed with respect to the read address, the write address signals from line 106 are latched into write address registers 112 and 114 if the function signals indicated a write request is being performed. The most significant bits of the write address are latched into write address register 112 and the least significant bits of the write address are latched into write address register 114. The entire latched write address is driven by both write address registers 112 and 1 14 onto line 117, and provided to each of segment 0 60, segment 1 62, segment 2 64, and segment 3 66 on lines 134, 136, 138, and 140, respectively. The latched read and write address signals remain in the respective register until the requested read or write operation to the SC0 28 is completed.

As shown in FIG. 2, a remote input circuit 105 and 105' (shown dashed) is associated with each remote segment interface in the system. The remote input circuits 105 and 105' are similar to the input circuits 104 and 104' shown in FIG. 3 However, unlike the input circuits 104 and 104', the remote input circuits 105 and 105' only provide the latched address signals to the segments associated with the particular remote interface. For example, the remote input circuit 105 for the remote 0/2 interface 94 of FIG. 2 only provides the latched read address to segment 0 or segment 2 on lines similar to those shown as 126 and 130 of FIG. 3 for a read request, or a lines similar to those shown as 134 and 138 for a write request. This is because the SC making the request across the remote interface has already determined that these address signals map into either segment 0 or segment 2. Therefore, the remote input circuit 105 does not have to couple to all segments. In a similar manner, the remote input circuit 105 for a remote 1/3 interface 96 of FIG. 2 only provides latched address signals to the appropriate one of segment 1 62 or segment 3 66.

Finally, it should be mentioned that, for reasons beyond the scope of this Application, all address signals are not provided to a respective input circuit at one time. Instead, approximately half of the address signals arrive before the rest of the address signals. The first address signals to arrive are latched into either read address register 108 or to write address register 112, depending on whether the address is associated with a requested read operation, or a requested write operation, respectively. These are latched into the appropriate register by the active edge of a system clock shown in FIG. 3 as the phase 1 clock on line 142. One clock period later (also commonly referred to as one cycle later), the active edge of the phase 1 clock on line 142 latches the second group of address signals into either read address register 110 or write address register 114 depending on the requested operation. The read address register 108 is said to provide the latched cycle 1 read address signals, and write address register 112 is said to provide the latched cycle 1 write address signals. Similarly, read address register 110 is said to provide the latched cycle 2 read address signals, and write address register 114 is said to provide the latched cycle 2 write address signals. This is true both for the input circuits 104 and 104', and the remote input circuits 105 and 105'.

From the above discussion, it should be appreciated that each of the input circuits 104 and 104' is connected to each other local segment in a point-to-point manner. Likewise, each of the remote input circuits 105 and 105' is connected to two other associated segments in a point-to-point manner. Therefore, even though the circuits within input logic circuit 80 are shown in FIG. 2 collectively driving an address/control interface represented on a single line 84, this interface represents a plurality of cross-bar couplings. The same is true of the address/control interface represented on line 86.

Figure 4A:
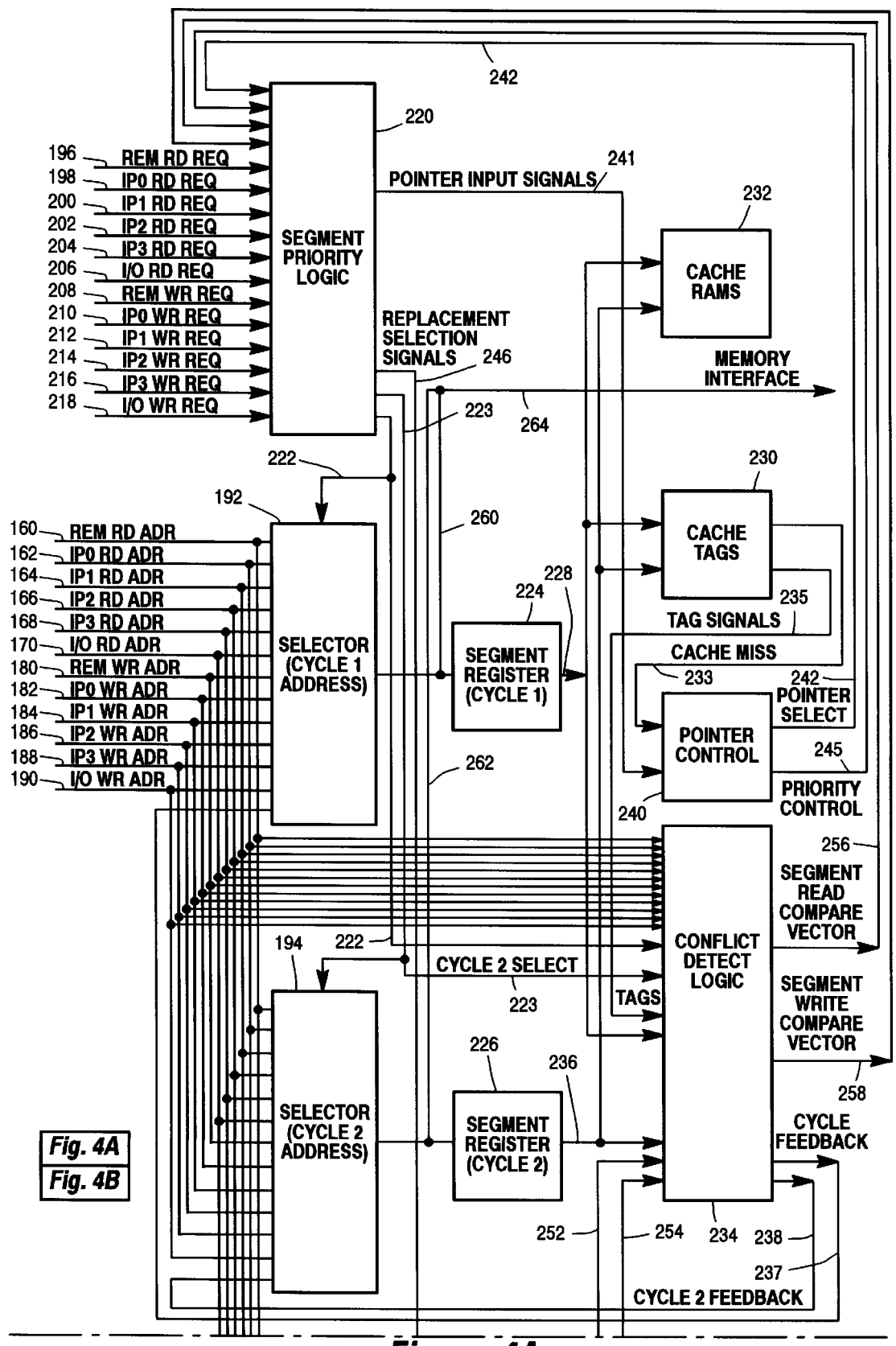
FIGS. 4A and 4B, when arranged as shown in FIG. 4, are a schematic block diagram of logic within each of the cache segments of FIG. 2.
Figure 4B:
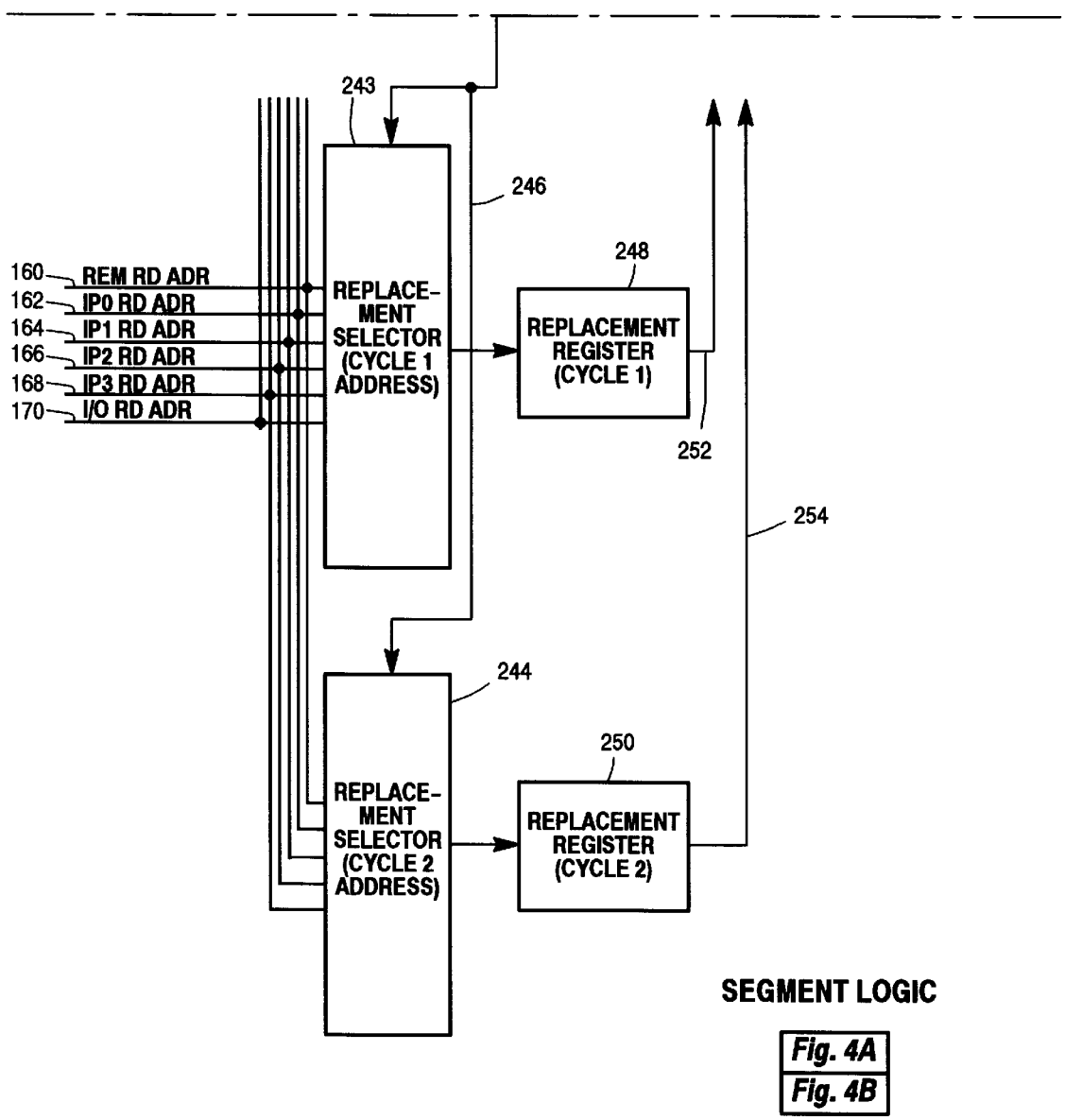

FIGS. 4A and 4B, when arranged as shown in FIG. 4, are a schematic block diagram of logic within each of the cache segments of FIG. 2. As shown in FIG. 4A, each of the segments may receive as many as twelve different request addresses at any given time. This is a result of the cross-bar configuration discussed above which couples each segment to input circuits 104 and 104' associated with each local IP and I/O unit, and further couples each segment to the associated one of two remote input circuits 105 and 105'. Therefore, each segment is coupled to five input circuits 104 and 104', and one remote input circuit 105 and 105'. Each segment receives two addresses from each of the coupled circuits, a latched read address and a latched write address, as discussed above, for a total of twelve latched request addresses. As mentioned above, each segment receives these address signals via point-to-point couplings which are shown collectively on line 84 for SC0 28, and on line 86 for SC1 29.

For discussion purposes, FIG. 4 shows the couplings for segment 0 60 of SC0 28, although it is understood that similar couplings and similar logic structures exist within any other segments within SC0, and within the segments local to SC1 29. The segment 0 60 is shown receiving latched read address signals on line 160 from the remote input circuit 105 associated with the remote 0/2 interface on line 94 of FIG. 2. Segment 0 further receives latched read address signals from the input circuits 104 associated with each of IP0 31, IP1 33, IP2 35, IP3 37, and I/O unit 46 on lines 162, 164, 166, 168, and 170, respectively. Segment 0 receives latched write address signals on line 180 from the remote input circuit 105 associated with the remote 0/2 interface 94. Segment 0 further receives latched write address signals from the input circuits 104 associated with each of IP0, IP1, IP2, IP3, and I/O unit 46 on lines 182, 184, 186, 188, and 190, respectively.

Each set of latched address signals provided on lines 160, 162, 164, 166, 168, 170, 180, 182, 184, 186, 188, and 190 discussed above is driven from two address registers in the respective input circuit 104, as discussed above and shown in FIG. 2. Read address register 108 and write address register 112 of the corresponding input circuit provide the cycle 1 read address and cycle 1 write address, respectively, and read address register 110 and write address register 114 of the corresponding input circuit provide the cycle 2 read address and cycle 2 write address, respectively. The cycle 1 read address and cycle 1 write address signals are provided to selector 192, and the cycle 2 read address and cycle 2 write address signals are provided to selector 194.

Segment 0 also receives read request and write request signals from the coupled input circuits. These signals correspond to those shown on line 118 in FIG. 3 (shown for a single requester). Read request signals are received on lines 196, 198, 200, 202, 204, and 206 from the input circuits 104 associated with IP0, IP1, IP2, IP3, and I/O unit 46, and from remote input circuit 105 associated with remote 0/2 interface of FIG. 2. Write request signals are received on lines 208, 210, 212, 214, 216, and 218 from the input circuits 104 associated with IP0, IP1, IP2, IP3, and I/O unit 46, and from the remote input circuit 105 associated with remote 0/2 interface 94. These signals are provided to segment priority logic 220.

Each requesting unit may have a read request and a write request pending to the local SC at the same time. Therefore, if every unit has a read and a write request pending to the same segment, a maximum of twelve request addresses can be latched in the input circuits 104 waiting to be selected by selectors 192 and 194 of the associated segment. The order in which these requests are processed is determined by a predetermined segment priority scheme implemented in the segment priority logic 220. Based on the priority scheme, the segment priority logic 220 provides selection signals shown on lines 222 and 223 to selectors 192 and 194, respectively, to direct selection of the latched address signals from one of the requesting units and provide these signals to the segment registers 224 and 226, respectively.

As mentioned above, input circuits 104 and 104' of FIG. 3 provide the cycle 1 read address or cycle 1 write address signals to the selector 192 one cycle before they provide the cycle 2 read address or cycle 2 write address signals to selector 194. Therefore, segment register 224 receives and latches cycle 1 address signals one cycle before segment register 226 latches the corresponding cycle 2 address signals.

Segment register 224 provides the latched address signals as the segment cycle 1 address on line 228 to the cache tags 230, the cache RAMs 232, and to the conflict detect logic 234. One cycle later, segment register 226 provides the latched address signals as the segment cycle 2 address on line 236 to the cache tags 230, cache RAMs 232, and to the conflict detect logic 234.

The cache RAMs 232 of the preferred embodiment provide a set-associative addressable, store-in cache which is well know in the art. The segment cycle 1 address is provided to the cache tags 230 on line 228 as the set address to read the tag signals. The tags signals are then compared to predetermined ones of the cycle 2 address signals to determine if a cache hit occurred. If the tag signals on line 235 favorably compare to predetermined ones of the segment cycle 2 address signals, the requested operation to the cache RAMs 232 is allowed to complete.

If the tag signals on line 235 do not favorably compare to predetermined ones of the cycle 2 address signals, a cache miss occurred. The cache miss signal is provided on line 233 to the pointer control 240, and pointer control then queues the request. Pointer control 240 receives pointer input signals from the segment priority logic 220 on line 241 which indicate to the pointer control which request address is associated with the request being queued. Pointer select signals on line 242 and priority control signals on line 245 are provided by the pointer control 240 to the segment priority logic 220. These signals affect the predetermined segment priority scheme of the segment priority logic 220 in a manner to be discussed further below.

Eventually, the queued request is selected from the pointer control 240 and provided to the segment priority logic 220 on line 242. Based on the predetermined priority scheme, segment priority logic 220 generates the segment selection signals on lines 222 and 223 which cause selectors 192 and 194, respectively, to re-select the associated request address from the appropriate input circuit 104. The cycle 1 and cycle 2 latched address signals are provided on paths 260 and 262, respectively, to the memory interface on line 264. From the memory interface, these addresses are provided to the appropriate remote interface, and may further be presented to the shared main memory 54 in a manner which is beyond the scope of this Application.

FIG. 4 further includes replacement selectors 243 and 244, which receive latched read address signals from the remote input circuit 105 associated with the remote 0/2 interface 94 of FIG. 2, and further from the input circuits 104 associated with IP0, IP1, IP2, IP3, and I/O unit 46 on lines 160, 162, 164, 166, 168, and 170, respectively. In a manner similar to that described above with respect to selector 192, replacement selector 243 receives the cycle 1 latched read addresses. In a manner similar to that described above with respect to selector 194, replacement selector 244 receives the cycle 2 latched read addresses. Based on a predetermined priority scheme, the segment priority logic 220 provides replacement selection signals shown on line 246 which causes replacement selectors 243 and 244 to select latched read address signals from the input circuit 104 or the remote input circuit 105 of one of the requesting units and provide these signals to the replacement registers 248 and 250, respectively. Replacement register 248 receives and latches the cycle 1 read address one cycle before replacement register 250 receives and latches the cycle 2 read address. The latched address signals provided by replacement registers 248 and 250 are referred to collectively as the replacement address, which is provided on lines 252 and 254, respectively. The replacement registers 248 and 250 will be discussed further below.

Finally, the conflict detect logic 234 of FIG. 4 is shown receiving latched address signals from each of the input circuits 104 of FIG. 3 associated with segment 0 60, and is shown receiving latched address signals from the remote input circuit 105 associated with the remote 0/2 interface 94 of FIG. 2. The conflict detect logic uses these address signals in conjunction with the segment cycle 1 address and the segment cycle 2 address received from selectors 192 and 194, respectively, to detect the occurrence of address conflicts in a manner to be discussed further below. The conflict detection logic 234 also receives tag signals on line 235, which are used to detect flush conflicts in a manner described below. The conflict detect logic 234 provides two feedback paths, the cycle 1 feedback path and the cycle 2 feedback path on lines 237 and 238 respectively, to selector 192 and selector 194, respectively, and provides a segment read compare vector and a segment write compare vector on lines 256 and 258, respectively, to the segment priority logic 220. These signals will be discussed below in reference to the conflict detect logic 234.

Figure 5:
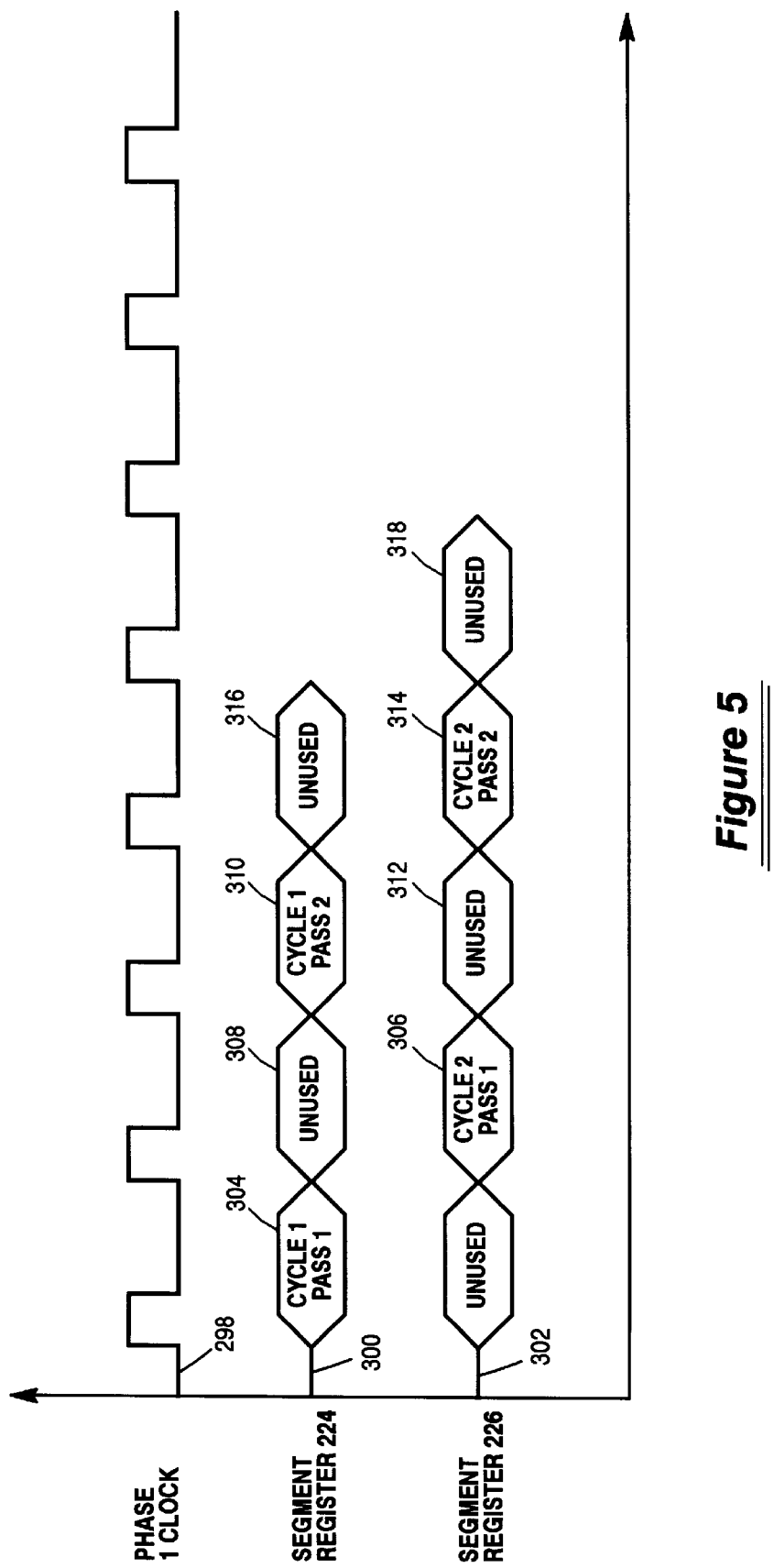
FIG. 5 is a timing diagram showing addresses being provided from the segment registers of FIG. 4 during a request to the cache tags and the cache RAMs.

FIG. 5 is a timing diagram showing how addresses are provided from the segment registers 224 and 226, respectively, during a request to the cache tags 230 and the cache RAMs 232 of FIG. 4. Waveforms 300 and 302 correspond to the contents of segment registers 224 and 226, respectively. Addresses are latched into both of the segment registers 224 and 226 on the active edge of the phase 1 clock signal shown as waveform 298. For various reasons that result in increased performance and which are beyond the scope of this Application, the cycle 1 and cycle 2 address signals from a single requester are each provided from the input circuit 104 and 104' of FIG. 3 to the cache tags 230 and the cache RAMs 232 of FIG. 4 in multiple passes. During what is referred to as pass 1, both cycle 1 and cycle 2 address signals are initially presented to cache RAMs 232. Later, during what is referred to as pass 2, the cycle 1 and cycle 2 address signals are again presented to cache RAMs 232. It may be remembered that an address is latched within the registers of the associated input circuit 104 and 104' until the associated operation is complete. Thus, these signals are available to be provided to the segment registers 224 and 226 during the multiple passes to the cache RAMs 232.

The multiple-pass mechanism is shown in FIG. 5 as follows. During pass 1, the cycle 1 address is latched into the segment register 224 of FIG. 4 from the selected one of the input circuits 104 and 104', as shown by portion 304 of waveform 300. One cycle later, the cycle 2 address is latched into segment register 226, as shown by portion 306 of waveform 302. Later during pass 2, the cycle 1 address is again provided by the input circuit 104 and latched into segment register 224, as shown by portion 310 of waveform 300. One clock cycle later, the cycle 2 address is again latched into segment register 226, as shown by portion 314 of waveform 302.

Between pass 1 and 2 of any request, segment registers 224 and 226 are unused by that request. This is shown by waveform portions 308 and 312, respectively. In a manner which is beyond the scope of this Application, a second request address for a different request may be latched by segment registers 224 and 226 and presented to cache during these unused cycles. For example, the cycle 1 and cycle 2 address for the second request could be latched into segment registers 224 and 226, respectively, during the time represented as waveform portions 308 and 312, respectively. Segment registers 224 and 226 would then again latch the cycle 1 and cycle 2 addresses, respectively, of the first request address during pass 2 of that first request as shown by waveform portions 310 and 314, respectively. Finally, register 224 and 226 would further latch the second request address during the time represented by portions 316 and 318, respectively, of FIG. 5 during what would be pass 2 for the second request. Thus, in the system of the preferred embodiment, two requests may be presented to the cache tags 230 and the cache RAMs 232 in an interleaved manner. This will discussed further below with respect to the conflict detect logic 234.

Conflict Detect and Resolution

As discussed above, to maintain cache coherency in a multiple processor system coupled to a shared cache memory, conflict detection must be performed. In the prior art, conflict detection is performed by latching a request address, then comparing the latched set address for that current request to the set address associated with every other pending request. If two set addresses favorably compare, the address associated with the request address is marked as a conflict. When it is time to process that request address, it is re-directed to the cache instead of being presented to other memory units such as the remote SC segments or to the shared main memory 54 of the preferred embodiment.

As discussed above, saving large addresses such as those associated with a large data processing system requires a large amount of logic circuits. Therefore, the current invention, which is an improved conflict detection and resolution system, does not operate on the request addresses, but instead on pointers to the request addresses. The improved conflict detection system also provides a queue entry for every request that could be pending simultaneously in the system at once. This allows requesters that do not have both a read and a write request queued within the pointer control 240 to continue making requests to the cache RAMs 232, which significantly improves system throughput. In addition, the invention provides an improved conflict detection and resolution mechanism capable of using pointers to record conflicts between interleaved request addresses such as those discussed above with respect to FIG. 5. Finally, the invention allows use of pointers to record conflicts involving delayed flush and replacement operations. These aspects of the invention will be discussed further below.

Figure 6A:
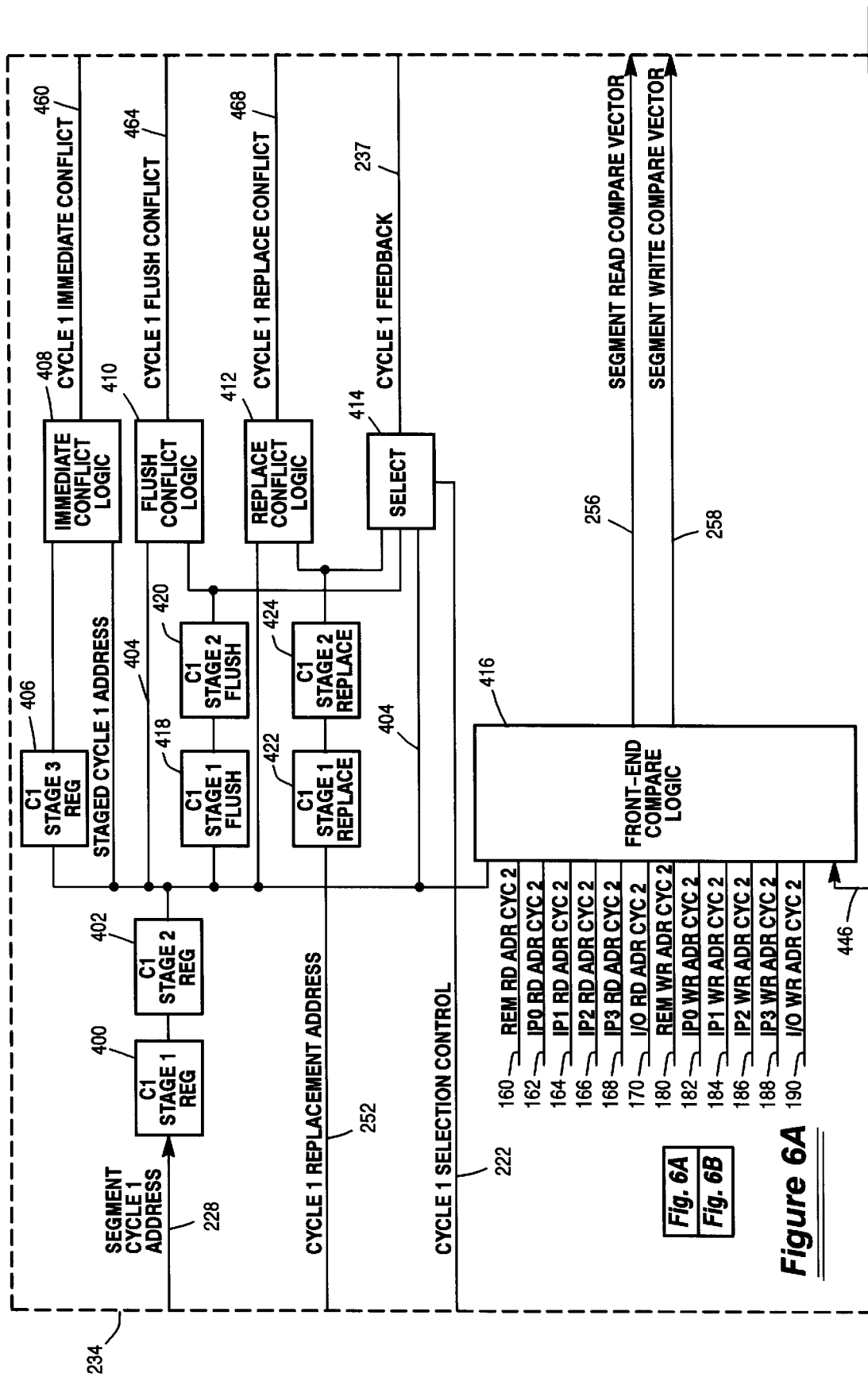
FIGS. 6A and 6B, when arranged as shown in FIG. 6, are a schematic block diagram of the conflict detection circuit of the current invention.
Figure 6B:
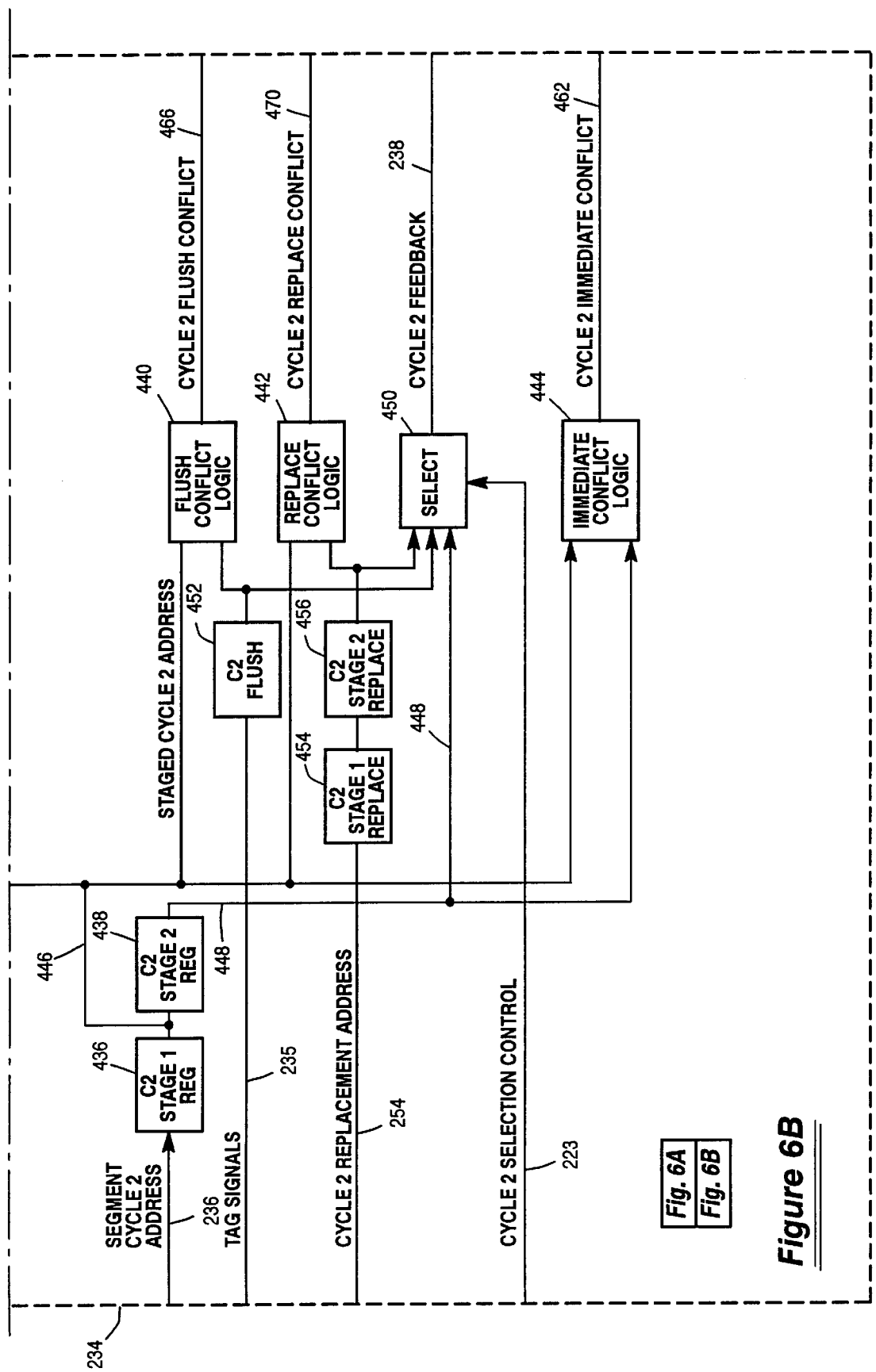

FIGS. 6A and 6B, when arranged as shown in FIG. 6, are a schematic block diagram of the conflict detection logic 234 of the current invention. The circuit shown in FIG. 6A provides conflict detection for the segment cycle 1 address, and the circuit shown in FIG. 6B provides conflict detection for the segment cycle 2 address.

The segment cycle 1 address on line 228 is provided to cycle 1 (C1) stage 1 register 400, where it is latched and provided one clock cycle later to C1 stage 2 register 402. The staged cycle 1 address is provided by C1 stage 2 register 402 on line 404 to C1 stage 3 register 406, the immediate compare logic 408, the flush compare logic 410, the replace compare logic 412, selector 414, and to the front-end compare logic 416. The staged cycle 1 address on line 404 is further provided to C1 stage 1 flush register 418. If the staged cycle 1 address results in a cache miss such that a flush operation is pending, the address would be latched by the C1 stage 1 flush register 418 would further be latched by the stage 2 flush register 420, as will be discussed further below. The conflict detect circuit 234 also includes stage 1 and stage 2 replace registers, 422 and 424, respectively, which will be discussed further below in reference to a replacement operation.

As discussed in reference to FIG. 4 above, conflict detect logic 234 receives the latched addresses from respective ones of the input circuits 104 and 104'. For discussion purposes and to be consistent with FIG. 4 above, FIG. 6 shows the couplings to the input circuits 104 associated with the segment 0 conflict detection logic 234 of SC0 28. Namely, the particular illustrated embodiment of the conflict detect logic 234 receives latched read address signals from the remote input circuit 105 associated with remote 0/2 interface on line 160, and from the input circuits 104 associated with IP0 31, IP1 33, IP2 35, IP3 37, and I/O unit 46 on lines 162, 164, 166, 168, and 170, respectively. The conflict detect logic is further shown receiving latched write address signals from the remote input circuit 105 associated with remote 0/2 interface on line 180, and from the input circuits of IP0, IP1, IP2, IP3, and I/O unit 46 on lines 182, 184, 186, 188, and 190, respectively. It is understood that similar couplings exist within any of the other conflict detect logic 234 associated with any other segment in the system.

The above discussion of FIG. 6A describes conflict detect logic primarily associated with the segment cycle 1 address. Similar conflict detect logic for the segment cycle 2 address is shown in FIG. 6B. The segment cycle 2 address is provided on line 236 to the cycle 2 (C2) stage 1 register 436 approximately one clock cycle after the cycle 1 address is provided to the C1 stage 1 register 400. C2 stage 1 register 436 latches the cycle 2 address at approximately the same time as the C1 stage 2 register 402 latches the cycle 1 address. Therefore, the C2 stage 1 register 436 provides the staged cycle 2 address on line 446 at approximately the same time as the C1 stage 2 register 402 provides the staged cycle 1 address on line 404. The staged cycle 2 address is provided to the C2 stage 2 register 438, the flush compare logic 440, the replace compare logic 442, the immediate compare logic 444, and to the front-end compare logic 416 on line 446. The C2 stage 2 register 438 provides the stage 2 staged cycle 2 address on line 448 to selector 450 and to immediate compare logic 444. The conflict detect logic associated with the segment cycle 2 address further includes a C2 flush register 452 which receives the tag signals on line 235 from the cache tags 230 of FIG. 4 if the staged cycle 2 address on line 448 results in a cache miss such that a flush operation is pending, as will be discussed further below. The latched address captured in the C1 stage 2 flush register 420 and the C2 flush register 452 following a cache miss is referred to as the flush address, and will be discussed further below. Conflict detect logic further includes the replace register 454 to receive the cycle 2 replacement address on line 254 from replacement register 250 of FIG. 4 and to provide the address to the stage 2 replace register 456 during a replacement operation, as will be discussed further below.

The conflict detect logic 234 indicates the presence of conflicts in a variety of situations to be discussed in full below. Immediate conflicts for staged cycle 1 and staged cycle 2 addresses are indicated by the cycle 1 immediate conflict signal on line 460, and the cycle 2 immediate conflict signal on line 462, respectively. Flush conflicts for staged cycle 1 and staged cycle 2 addresses are indicated by the cycle 1 flush conflict signal on line 464, and the cycle 2 flush conflict signal on line 466, respectively. Replace conflicts for staged cycle 1 and staged cycle 2 addresses are indicated by the cycle 1 replace conflict signal on line 468, and the cycle 2 replace conflict signal on line 470, respectively. Conflicts with front-end addresses are indicated by the segment read and write compare vectors, 256 and 258, respectively. Finally, the conflict detect logic 234 provides cycle 1 and cycle 2 feedback paths on lines 237 and 238, respectively, shown in FIG. 4 being provided to selectors 192 and 194, respectively. The use of each of these signals will be discussed further below.

The operation of the conflict detect circuit 234 of FIG. 6 can best be explained by example. Assume a write request to address A1 from the input circuit 104 associated with IP0 31 is selected to be provided to the cache tags 232. The write request address results in a cache miss. The request is provided to the conflict detect logic 234. If no other prior request is associated with address A1 in the pointer control 240, no conflict is detected by the conflict detect logic 234. A pointer to IP0's write registers in IP0's input circuit 104 will therefore be added to pointer control 240 without a conflict indication. Segment priority logic 220 of FIG. 4 indicates the identity of the current requester to the pointer control 240 over line 241 so that the appropriate pointer can be queued. Eventually the queued request pointer will be selected from the top of the queue and the write request address will again be provided from IP0's input circuit 104 to the segment 1 and segment 2 registers 224 and 226, respectively, as will be discussed below.

While the write request is still queued by the pointer control 240, a read request to address A1 from the IP1 input circuit is selected to be presented to the cache tags 232. Again, a cache miss occurs. The read request is presented to the conflict detect logic 234. This time, however, a write request is already recorded in the pointer logic 240 associated with address A1. Therefore, a conflict will be detected by the conflict detect logic 234.

In this case, the conflict detect logic 234 operates as follows. The segment cycle 1 address and segment cycle 2 address are latched at approximately the same time into the C1 stage 2 register 402 and the C2 stage 1 register 436, respectively. The staged cycle 1 address on line 404 and the staged cycle 2 address on line 446 are therefore provided to the front-end compare logic 416 at approximately the same time. The staged cycle 1 address and staged cycle 2 address for IP1 are concatenated to form the complete read request address, then compared by the front-end logic 416 to every other latched address from the input circuits 104 associated with the respective segment. The staged cycle 1 and staged cycle 2 read address for IP1 will compare favorably in this case to the latched write address provided by the input circuit 104 associated with IP0 31. (It will be remembered that this latched write address for the queued IP0 write request remains latched in the input circuit 104 until after the write address had been presented to the memory interface, the requested data signals have been returned, and the write operation has subsequently been completed.) The segment read compare vector on line 256 will indicates this favorable compare to the segment priority logic 220 of FIG. 4. The segment priority logic 220 provides an identification of the requester and an indication of the conflict on line 241 of FIG. 4 to the pointer control 240. When the IP1 write request is queued by the pointer control, the presence of the conflict will be recorded in a manner to be described below. A similar segment write compare vector on line 258 is used to indicated a favorable compare when a write request is the conflicting request.

It may be noted that the staged cycle 1 and staged cycle 2 IP1 read address will compare favorably to the read address latched in the input circuit associated with IP1, that is, will compare favorable to "itself", This "false conflict" is taken into account by the segment priority logic 220 which determines that an IP1 read request is occurring and will therefore not indicate to the pointer logic 240 the conflict between the IP1 staged address and the IP1 address of the input circuit 104.

Figure 7:
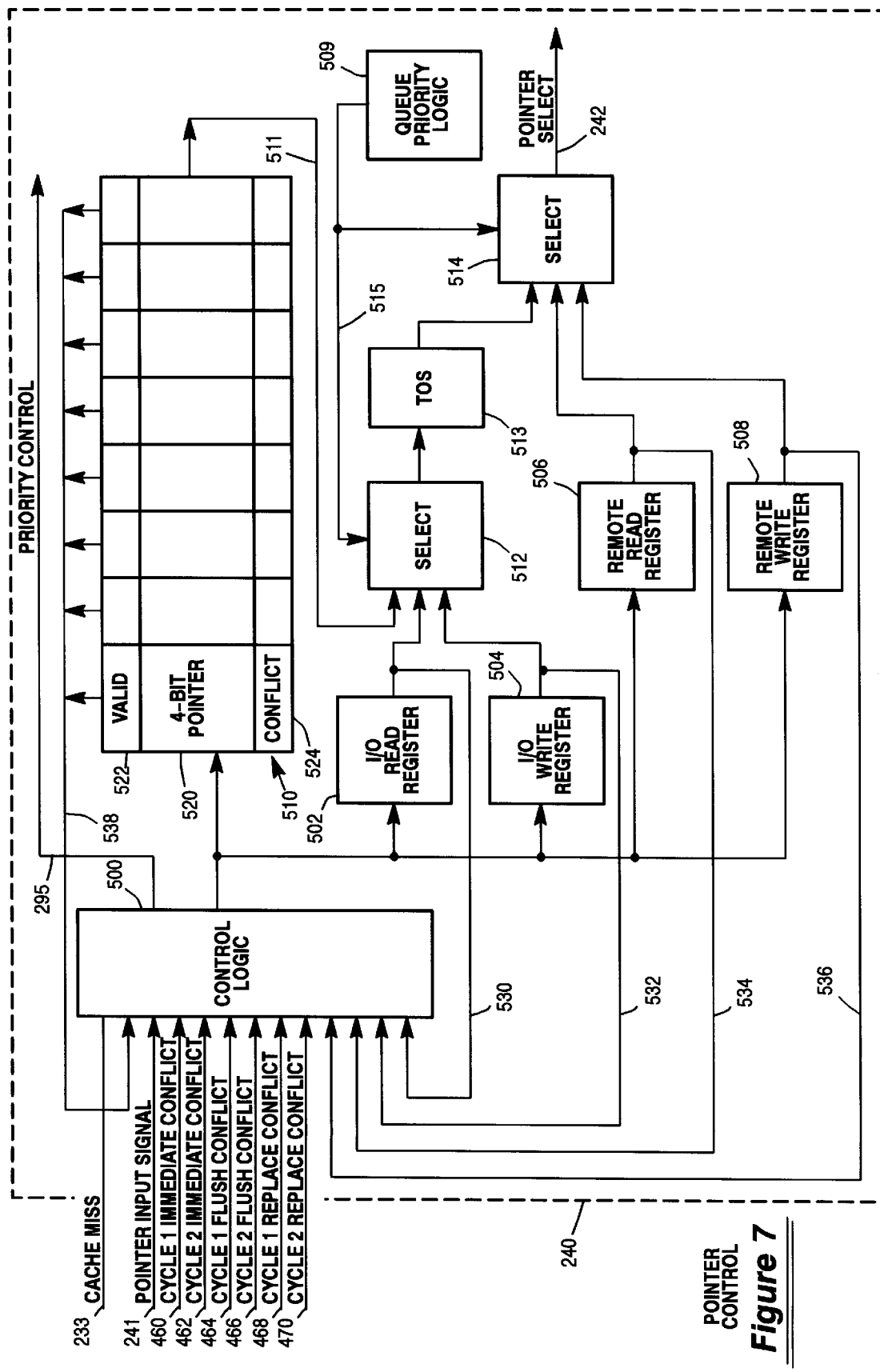
FIG. 7 is a schematic block diagram of the pointer control logic used to queue requests that are pending to either the cache or to the memory interface.

FIG. 7 is a schematic logic diagram of the pointer control logic 240 of FIG. 4 which is used to queue requests that are pending to either the cache RAMs 232 or to the memory interface 264. The pointer control 240 receives the pointer input signals 241 from the segment priority logic 220. The pointer control 240 receives the cycle 1 and cycle 2 immediate conflict signals on lines 460 and 462, respectively, the cycle 1 and cycle 2 flush conflict signals on lines 464 and 466, respectively, and the cycle 1 and cycle 2 replace conflict signals on lines 468 and 470, respectively, from the conflict detect logic 234. Each of the above enumerated signals is provided to the control logic 500. The use of each of these signals will be discussed below.

The pointer logic 240 further includes I/O read register 502 and I/O write register 504 used to queue I/O read and I/O write requests, respectively, remote read register 506 and remote write register 508 used to queue remote read and remote write requests, respectively, and an IP request FIFO 510 having at least eight registers, and which is capable of queuing a read and a write request from each of the four local IPs associated with the segment. A request will be added to one of the above-enumerated registers or to the IP request FIFO 510 based on the identity of the request address indicated on line 241 to control logic 500 in a manner to be discussed below. The pointer logic 240 is further capable of queuing one read and one write from the I/O unit, and from the remote interface.

Requests stored within the pointer logic 240 are processed according to a predetermined priority scheme. Requests stored within the IP request FIFO 510 are provided on line 511 to the selector 512 on a first-in first-out basis so that the oldest IP request is processed first. Queue priority logic 509 provides selection control signals on line 515 that conditions selector 512 to select a valid queued request from either the I/O read register 502, I/O write register 504, or from the IP request FIFO 510 on line 511 based on a predetermined queue priority scheme controlled by the queue priority logic 509. Selector 512 provides the selected request to the top-of-stack (TOS) register 513. Queue priority logic 509 further provides selection control signals on line 515 that conditions selector 514 to select a valid request from either the TOS register 513, the remote read register 506, or the remote write register 508 according to a predetermined queue priority scheme. The selected request is identified using the pointer select signals, which are provided on line 242 to the segment priority logic 220 of FIG. 4. The pointer select signals on line 242 affects the predetermined segment priority scheme so that segment priority logic 220 will eventually provide segment selection signals on lines 222 and 223, respectively, to cause selectors 192 and 194 of FIG. 4 to select the address associated with the pointer select signals on line 242. The selected address will be gated from the respective input circuit 104 and 104' or the respective remote input circuit 105 and 105' to the memory interface on line 264.

Each of the request registers of the pointer control logic 240, including I/O read and I/O write registers 502 and 504, respectively, the remote read and remote write registers 506 and 508, respectively, and each of the at least eight registers in the IP request FIFO 510, includes a four-bit request pointer field 520 which points to a latched request address in the input circuit 104 and 104' or the remote input circuit 105 and 105' associated with the queued request. Each of the above enumerated registers further includes a valid bit 522 which is set when a valid request is entered into the respective register. This bit is cleared when the request has been completed. Finally, each of the enumerated registers includes a conflict bit 524 which indicates that the request is in conflict with some other request address previously queued in the pointer logic 240.

The contents of each of the above enumerated registers is provided to the control logic 500 on pointer feedback paths. The contents of the I/O read register 502, I/O write register 504, the remote read register 506, and the remote write register 508 are provided on lines 530, 532, 534, and 536 respectively. The contents of each of the eight registers in the IP request FIFO 510 is provided on paths shown collectively on line 538.

Returning now to the current example, the cache miss signal on line 233 indicates that a cache miss occurred and that a request should be entered into the queue. The pointer input signals on line 241, which are provided by the segment priority logic 220, indicate that the request is associated with the IP1 read address. The pointer input signals further indicate that the IP1 read address compared favorably to the IP0 write address in the IP0 input circuit 104, and that a potential conflict situation therefore exists. The control logic 500 compares the pointer input signals on line 241 to the signals received on each of the pointer feedback paths 530, 532, 534, 536, and 538. The valid four-bit request pointer field 520 associated with the valid IP0 entry in the IP request FIFO 510, which is provided on pointer feedback path 538, is used by the control logic 500 to validate the potential conflict situation. Next, a four-bit request pointer field which points to the IP1 read address in the IP1 input circuit 104 is entered into the IP request FIFO 510. The valid bit 522 is set. Further, as a result of the conflict validation, the conflict bit 524 is set.

Eventually, the queued pointer to the IP0 write address will be selected by selector 514 and provided as the pointer select signals on line 242 to the segment priority logic 220. Based on the predetermined segment priority scheme, the segment priority logic 220 will cause selectors 192 and 194 of FIG. 4 to select the IP0 write address from the IP0 input circuit, and this address will be presented on paths 260 and 262, respectively, to the memory interface on line 264.

In the system of the preferred embodiment, only read requests to the cache RAMs 232 that result in a cache miss cause replacement operations to occur. Therefore, if the IP0 write request address of the above example had instead been a read request address, the pointer select signals on line 242 would further cause the segment priority logic 220 to generate the replacement select signals on line 246 so that the replacement selectors 243 and 244 select IP0's latched read address from IP0's input circuit 104. The cycle 1 read address is provided to replacement register 248 and the cycle 2 read address is provided to replacement register 250. The address contained in replacement registers 248 and 250 is referred to as the replacement address. The replacement address will be used to perform the replacement operation when requested data signals are returned from memory interface 264 as a result of a read operation. The replacement address is always latched into the replacement registers 248 and 250 at approximately the time the latched read address is provided to the memory interface 264 following a read cache miss. The use of the replacement address will be discussed below.

Returning again to the current example, eventually, the data signals for the IP0 write request will be returned to segment 0 of SC0 28 on memory interface 264 and IP0's write request will be completed. At this time, the write address registers of IP0's input circuit 104, which are shown as write address register 112 and write address register 114 of FIG. 3, will be released to accept a new IP0 write request.

Sometime following the completion of the IP0 write request, the IP1 request pointer will be provided to the segment priority logic 220 of FIG. 4 as the pointer select signals on line 242 of FIG. 4, and the IP1 latched read address will be selected from IP1's input circuit 104. Since the associated conflict bit 524 is set, however, the read address will not be provided to the memory interface on line 264, but instead will again be presented to the cache tags 232 and cache RAMs 232 so that the updated data resulting from the IP0 write operation will be obtained by IP1.

The above example illustrates how the current invention solves the problems associated with the prior art memory queue and conflict detect scheme. First, memory requests are queued using four-bit pointers which are considerably smaller than the thirty or more bits used by prior art systems to record an entire memory address. Because each of the entries within the pointer logic 240 is much smaller than in prior art systems, storage can be provided for every possible request that may be pending simultaneously. In the preferred embodiment, this includes one read and one write request for each local unit and each of the remote interfaces associated with a segment. This expanded queue capacity results in increased system throughput. This is because requests can be presented to the cache RAMs 232 as long as any requester associated with the segment does not have both a read request and a write request pending to memory. Finally, full-address compares are performed between any request address and all other addresses latched within each of the input circuits 104 and the remote input circuit 105 associated with that segment. As a result, false conflicts are eliminated, which further increases system throughput.

The above example describes how a conflict is detected and resolved between a first write-miss request and a subsequent read request to the same address in the cache. The conflict detection system of the current invention provides conflict detection in multiple other situations as well. For example, assume a write request to address A1 has been latched in the input circuit 104 associated with IP0. Further assume a read request to address A1 has been latched in the input circuit associated with IP1. Based on the predetermined segment priority scheme implemented by the segment priority logic 220, the cycle 1 address signals and the cycle 2 address signals associated with IP0's write request to A1 are selected by selectors 192 and 194 and presented to segment registers 224 and 226 respectively of FIG. 4. As discussed above, the cycle 1 write address will be latched in segment register 224 one cycle before the cycle 2 write address will be latched in segment register 226, as shown by waveform portions 304 and 306, respectively, of FIG. 5. Assume further that the write request results in a cache hit, and pass 1 of the write operation is initiated.

As discussed in reference to FIG. 5 above, the cache of the preferred embodiment allows requests to the cache RAMs 232 to be interleaved. Assume, therefore, that the next address selected by segment priority logic 220 is the latched read address from IP1's input circuit 104. This cycle 1 and cycle 2 address from IP1's input circuit 104 is latched by segment registers 224 and 226, respectively, during the times not used by the IP0 write address, which correspond to waveform portions 308 and 312 of FIG. 5. The read request for IP1 results in a cache hit, but IP1 should never-the-less be denied access to the cache RAMs 232. This is because IP0's write operation to address A1 in the cache RAMs 232 will not be completed until after IP0's pass 2 to cache RAMs, as discussed above. Therefore, IP1's read request must be delayed until IP0 finishes the write operation.

The conflict between IP0 and IP1 is described as an "immediate" conflict which is the direct result of the high-speed cache interleave scheme employed by the cache circuitry of the preferred embodiment. It should be noted that the conflict detection performed by the front-end compare logic 416 as described above with respect to the first example will not detect this immediate conflict. That is because the previous IP0 write request did not result in a cache miss, and a valid request pointer is not associated with the IP0 write request in the IP request FIFO 510 of the pointer control 240. Therefore, some other mechanism is required to maintain coherency in this situation.

The conflict detect logic 234 uses immediate conflict detection to maintain coherency in cases such as the one described above. The segment cycle 1 address associated with IP0's pass 1 was received by the conflict detect logic 234 of FIG. 6 and latched into the C1 stage 1 register 400 which provided the address to the C1 stage 2 register 402, which in turn provided the address to the C1 stage 3 register 406. While IP0's address is still latched in the C1 stage 3 register 406, the segment cycle 1 address associated with IP1 is provided to the conflict detect logic, is latched by the C1 stage 1 register 400 and provided to the C1 stage 2 register 402. The IP1 cycle 1 address is provided on line 404 as the staged cycle 1 address, and the immediate control logic 408 compares the staged cycle 1 address of IP1 on line 404 to the IP0 cycle 1 address in C1 stage 3 register 406. If the compare is favorable, the cycle 1 immediate conflict signal is provided on line 460 to the pointer control 240.

In a manner similar to that described with respect to the cycle 1 addresses, the segment cycle 1 write address associated with IP0 from the previous write request was received by the conflict detect logic 234 of FIG. 6 and latched into the C2 stage 1 register 436 which provided the address to the C2 stage 2 register 438. The segment cycle 2 read address from IP1 is provided to the conflict detect logic, is latched by the C2 stage 1 register 436 and provided on line 446 as the staged cycle 2 address to immediate conflict logic 444. The immediate conflict logic compares the staged cycle 2 address on line 446 to the IP0 cycle 2 address which is still latched into the C2 stage 2 register 438, and provides the cycle 2 immediate conflict signal on line 462 if the two addresses compare. Because of the staging, the cycle 1 and cycle 2 immediate conflict signals on lines 460 and 462, respectively, are provided to the pointer control 240 at the same time. In response to receiving the cycle 1 and cycle 2 immediate conflict signals, a four-bit pointer field which points to the IP1 read address is added to the pointer control 240. The associated conflict and valid bits, 524 and 522, respectively, of FIG. 7, are set.

Following the detection of the immediate conflict, the priority control signals on line 245 cause the segment priority logic 220 to generate cycle 1 and cycle 2 selection control signals on lines 222 and 223, respectively. The cycle 1 selection control signal is provided to selector 414 of the conflict detect logic 234 in FIG. 6 so that the IP0 staged cycle 1 write address on line 404 is selected and driven onto the cycle 1 feedback path on line 237. The cycle 1 selection control further causes selector 192 of FIG. 4 to select the cycle 1 feed back path on line 237 so that the cycle 1 write address is re-presented to segment register 224. In a similar manner, the cycle 2 selection control signal on line 223 is provided to selector 450, causing the IP0 cycle 2 write address on line 448 to be driven onto the cycle 2 feedback path on line 238. The cycle 2 selection control further causes selector 192 of FIG. 4 to select the cycle 2 feed back path on line 237 so that the cycle 2 write address is re-presented to segment register 226. In this manner, the IP0 write address is re-presented to the cache RAMs 232 for pass 2 of the write operation.

Sometime after the IP0 write operation completes, the queued entry associated with the IP1 read operation will be selected and driven as the pointer select signals on line 242 to the segment priority logic 220 in the manner described above. In response, the segment priority logic 220 will eventually cause the IP1 address to again be presented to the cache RAMs 232. Since the IP0 write request has by this time completed, the IP1 will be provided with consistent data signals.

Figure 8A:
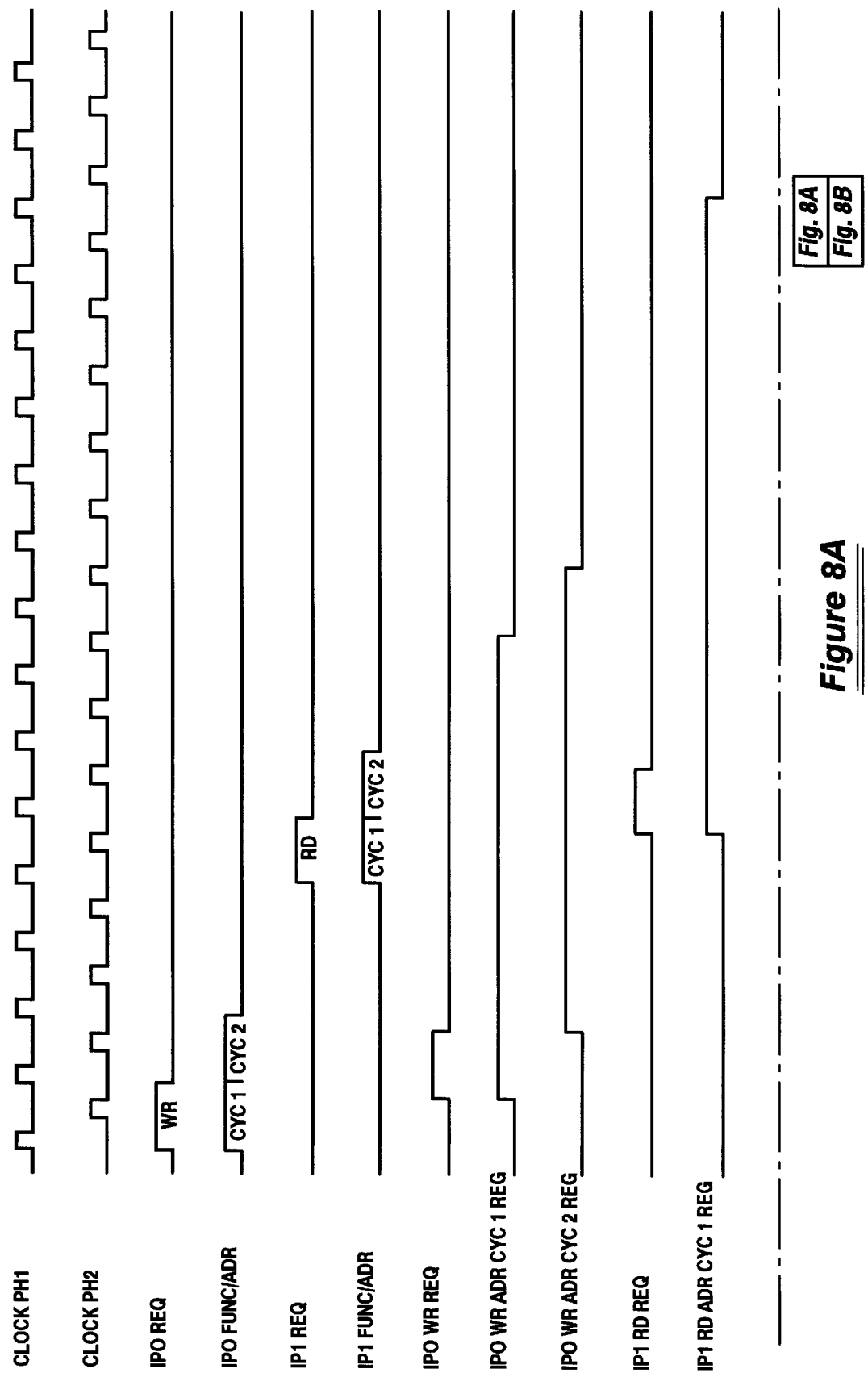
FIGS. 8A and 8B are a timing diagram showing immediate conflict detection and resolution between a first IP0 write request and a subsequent IP1 read request to the same address.
Figure 8B:
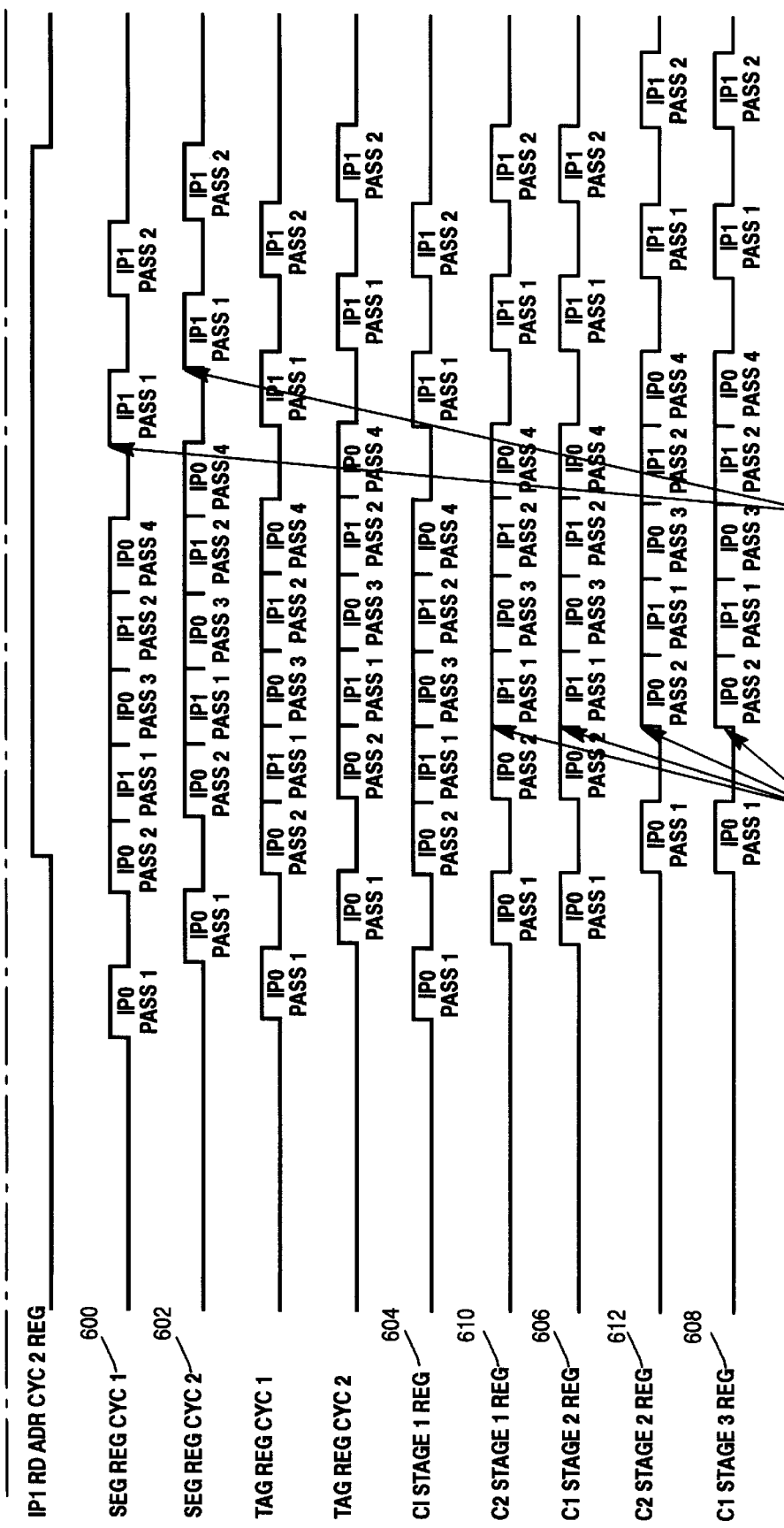

FIG. 8 is a timing diagram showing immediate conflict detection and resolution between a first IP0 write request and a subsequent IP1 read request to the same address. Waveforms 600 and 602 show the contents of the segment registers 224 and 226 of FIG. 4, respectively, during the conflict resolution. Waveforms 604, 606 and 608 show the contents of the C1 stage 1 register 400, the C1 stage 2 register 402, and the C1 stage 3 register 406, respectively of FIG. 6. Waveforms 610 and 612 show the contents of the C2 stage 1 register 436 and the C2 stage 2 register 438, respectively, of FIG. 6.

The conflict detection system also detects conflicts in delayed cache replacement situations. Again, this can be best explained by example. Assume a read request to address A1 has been latched into IP0's input circuit, is selected by the segment priority logic 220, and is latched into the segment registers 224 and 226. The address results in a cache miss.

Shortly after address A1 is presented to the cache RAMs 232, conflict detection is performed in a manner described above. Because a cache miss occurred, a resulting flush operation must occur so that the older cache data can be written back to shared main memory 54 and replacement data can be written to the cache RAMs 232. Therefore, following the IP0 cache miss to address A1, the staged cycle 1 address is latched by the C1 stage 1 flush register 418 and further latched by the C1 stage 2 flush register 420. Additionally, the tag signals are provided from the cache tags 230 on line 235 and are captured by the C2 flush register 452. The address in the C1 stage 2 flush register 420 and the C2 flush register 452 is the flush address. It should be noted that the staged cycle 1 address signals from address A1 provide the set address portion of the flush address, whereas the tag signals read from the cache tags 230 provide the block address portion of the flush address in a manner well-known in the art. The cache data will be written to the flush address in shared main memory 54 during the flush operation.

Because of the cache miss, a pointer to the IP0 read address was entered into the pointer control 240. Eventually, this pointer is selected from TOS register 513 by selector 514 of FIG. 7 and provided on line 242 to the segment priority logic 220. In response, the segment priority logic will sometime later cause the latched read address from IP0's input circuit 104 to be selected by selectors 192 and 194 and provided to the memory interface shown on line 264 of FIG. 4. The segment priority logic 220 will also generate replacement selection signals on line 246, which cause the replacement registers 248 and 250 to receive the latched read address from IP0's input circuit 104 in the manner described above.

When the data signals associated with read address A1 are returned from the memory interface on line 264, they are provided immediately to the IP0 so that the processor is not delayed. At this time, the read address registers of IP0's input circuit 104 are released to receive another read request address from IP0, even though the data signals have not yet been written back to the cache RAMs 232. The cache replacement operation may not occur immediately because higher priority operations are accessing the cache. During this time, the four-bit pointer signals 520 for the IP0 read address are still provided to the segment priority logic 220 as the pointer select signals on line 242.

Next, a read request to address A1 is latched in the input circuit 104 associated with IP1 before the replacement operation for address A1 has occurred but after the read address registers in IP0's input circuit have been released following presentation of the request data to IP0. The IP1 read address is selected by the segment priority logic 220 and is latched into the segment registers 224 and 226. Since a replacement operation has not yet occurred, IP1's read request will result in a cache miss if the read address A1 is provided to the cache tags 230. However, if a cache miss occurs, IP1's request will be re-presented to the memory interface on line 264, even though the requested data is already present in the segment and waiting for the cache replacement operation to occur. Directing the IP1 request to the memory interface wastes time and reduces the memory interface bandpass. Instead, the IP1's request should be delayed and re-presented to the cache RAMs 232 later. To facilitate this, replacement conflict detection is provided.

Replacement conflict detection is needed because the read address registers in IP0's input circuit have already been released to receive a new read request address. Therefore, the read address A1 may no longer be latched into the read address registers of IP0's input circuit 104, and the front-end compared logic 416 of FIG. 4 will not detect the conflict associated with the replacement operation.

Replacement conflict detection occurs for the current example as follows. Once the cycle 1 and cycle 2 IP0 replacement addresses are latched into registers 248 and 250, respectively, of FIG. 4, they are provided to the conflict detect logic 234 on lines 252 and 254, respectively. The cycle 1 replacement address on line 252 is latched into the C1 stage 1 and C1 stage 2 replacement registers 422 and 424, respectively, and provided to replace compare logic 412 of FIG. 6. Likewise, the cycle 2 replacement address on line 254 is latched into the C2 stage 1 and C2 stage 2 replacement registers 454 and 456, respectively, and provided to the replace compare logic 442. The IP0 cycle 1 and cycle 2 replacement addresses remain latched in the conflict detect logic 234 until the replacement operation occurs.

When the IP1 cycle 1 read address is selected to be provided to the cache RAMs 232, it is latched into the C1 stage 1 and the C1 stage 2 registers 400 and 402 of FIG. 6, respectively, of the conflict detect logic 234, and provided as the staged cycle 1 address on line 404 to the replace compare logic 412 in the manner discussed above. Likewise, the IP1 cycle 2 is latched into the C2 stage 1 register 436 and provided as the staged cycle 2 address on line 446 to the replace compare logic 442. In the current example, IP1's staged cycle 1 address will compare favorably to the cycle 1 replacement address in the C1 stage 2 replacement register 424, and the cycle 1 replace conflict signals on line 468 are provided to the pointer logic 240. Likewise, IP1's staged cycle 2 address will compare favorably to the cycle 2 replacement address in the C2 stage 2 replacement register 456, and the cycle 2 replace conflict signals on line 470 are provided to the pointer logic 240. It should be noted that because the staged cycle 1 address and staged cycle 2 address are provided at approximately the same time to the respective replace conflict logic 412 and 442, respectively, the cycle 1 and cycle 2 replace conflict signals on lines 468 and 470, respectively, are provided to the pointer logic 240 at approximately the same time. As a result, the control logic 500 of FIG. 7 causes the four-bit pointer field 520 for an IP1 read address to be added to the IP request FIFO 510 and marked as a conflict. The latched read address from IP1's input circuit 104 will again be provided to the cache RAMs 232 later after the replacement operation has completed.

Sometime later, the four-bit pointer field 520 for the IP0 read request address, which is still provided to the segment priority logic 220 as the pointer select signals on line 242, causes the segment priority logic 220 to generate cycle 1 selection and cycle 2 selection control signals on lines 222 and 223, respectively, of FIG. 4. The cycle 1 selection and cycle 2 selection control signals are provided to the conflict detect logic 234 to cause selectors 414 and 450 of FIG. 6 to select the cycle 1 and cycle 2 replacement addresses, respectively. The cycle 1 and cycle 2 replacement addresses are driven onto the cycle 1 feedback and cycle 2 feedback paths, respectively, on lines 237 and 238 respectively. The cycle 1 selection control signals and the cycle 2 selection control signal are further provided to selectors 192 and 194, respectively, causing the selectors to select the feedback paths on lines 237 and 238, respectively. This allows the replacement address to be presented from the conflict detect logic 234 to the cache. The replacement data signals are written to the cache on a data path (not shown). Sometime after the replacement operation is complete, the four-bit pointer field associated with the IP1 read address is selected by selector 514, driven to segment priority logic 220, and as a result, the IP1 read address is provided from IP1's input circuit to the cache.

The above-described replacement conflict detection mechanism prevents a request address that is in conflict with a replacement address from being directed to the memory interface on line 264. This ultimately allows the request to complete more quickly, and further prevents the request from unnecessarily tying up the memory interface.

Figure 9B:
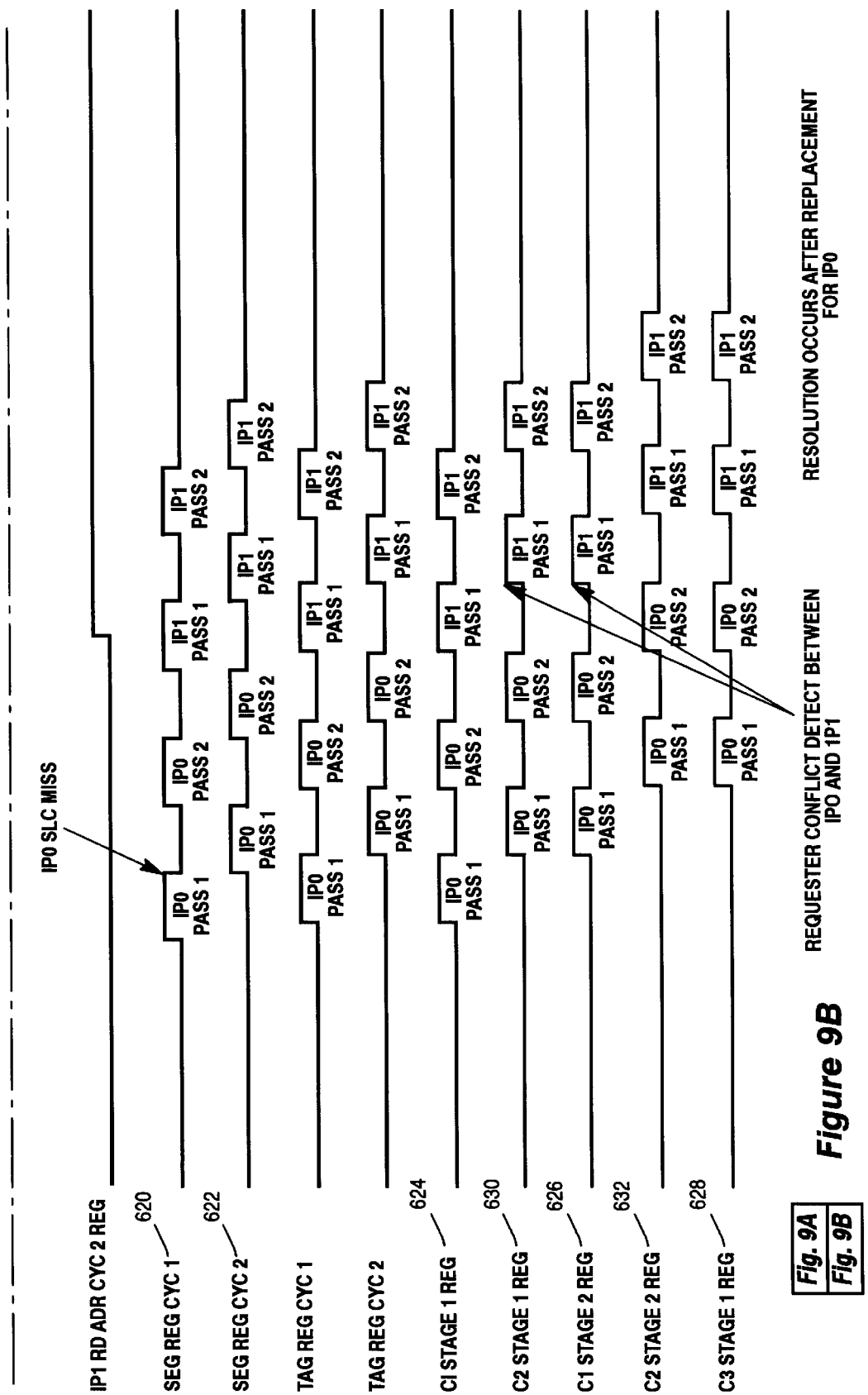

FIG. 9 is a timing diagram showing replacement conflict detection and resolution when an IP1 read request is made to the replacement address. Waveforms 620 and 622 show the contents of the segment registers 224 and 226 of FIG. 4, respectively, during the conflict resolution. Waveforms 624, 626 and 628 show the contents of the C1 stage 1 register 400, the C1 stage 2 register 402, and the C1 stage 3 register 406, respectively, of FIG. 6. Waveforms 630 and 632 show the contents of the C2 stage 1 register 436 and the C2 stage 2 register 438, respectively, of FIG. 6.

Finally, the conflict detection system of the current invention provides conflict detection for cache flushes. Cache flushes occur in conjunction with replacement operations. Following a cache miss, the flush address is captured into the C1 stage 2 flush register 420 and the C2 flush register 452 as described above. If cache updates have been made to the flush address, the flush address will be used to write the updated cache data back to the shared main memory 54. The new replacement data can then be added to the cache RAMs 232. The flush operation may not occur immediately, however. Following a cache miss, the cache-miss address may be presented to the main memory interface on line 264, and the requested data signals could be returned. The request data signals could then be provided to the requesting unit so that the unit is not delayed, as discussed above. Then, sometime later, the data must be written to cache during a replacement operation. Before a replacement operation can occur, however, a flush operation must be performed.

The flush address is saved in registers 420 and 452 of the conflict detect logic 234 as discussed above until the segment priority logic 220 grants the flush address access to the main memory interface on line 264. Because the flush operation may not occur immediately, a cache read request to the same address as the flush address must be marked as a conflict. Otherwise, the segment priority logic 220 could cause the read request to be presented to the memory interface on line 264 prior to the occurrence of the flush operation. If this occurs, the latest data signals, which are those to be written back to the shared main memory 54 during the flush operation, will not be provided to the requesting unit.

To detect and prevent this situation, flush conflict detection is performed by the conflict detect logic 234. Returning to the most recent example, assume the flush address resulting from IP0's cache miss is latched into the C1 stage 2 flush register 420 and the C2 flush register 452 as described above. Now assume that IP2 makes a read request to the flush address. The segment priority logic 220 causes the latched read address from IP2's input circuit 104 to be latched into the segment registers 224 and 236. The segment cycle 1 address is then latched into the C1 stage 2 register 402 to be provided as the staged cycle 1 address on line 404. Similarly, the segment cycle 2 address is latched into the C2 stage 1 register 436 to be provided as the staged cycle 2 address on line 446. Flush compare logic 410 compares the staged cycle 1 address to the signals provided by the C1 stage 2 flush register 420, and a favorable compare occurs. Flush compare logic 410 provides the cycle 1 flush conflict signals to the pointer control logic 240 on line 464. Similarly, flush compare logic 440 compares the staged cycle 2 address to the signals provided by the C2 flush register 452, and a favorable compare occurs. Flush compare logic 440 provides the cycle 2 flush conflict signals to pointer control logic 240 on line 466. It may be noted that because the staged cycle 1 address on line 404 and the staged cycle 2 address on line 446 are provided at approximately the same time to the flush compare logic 410 and 440, respectively, the cycle 1 flush conflict signals on line 464 and the cycle 2 flush conflict signals on line 466 are received by the pointer control 240 at approximately the same time.

The pointer control 240 receives the cycle 1 and cycle 2 flush conflict signals, and as a result, enters the four-bit pointer field 520 for IP2's read address into the IP request FIFO 510 with the respective conflict and valid bits, 524 and 522, respectively, set. The IP2 request pointer will eventually be provided to the segment priority logic on line 242, and the segment priority logic will generate selection control signals which cause the latched read address from IP2's input circuit to be re-presented to the cache.

In the mean time, priority control signals on line 245 from the pointer control 240 are provided to the segment priority logic 220. In response to these signals and according to the predetermined priority scheme, the segment priority logic generates cycle 1 selection and cycle 2 selection control signals on lines 222 and 223, respectively, of FIG. 4. The cycle 1 selection and cycle 2 selection control signals are provided to the conflict detect logic 234 to cause selectors 414 and 450 of FIG. 6 to select signals from the C1 stage 2 flush register 420 and the C2 flush register 452, respectively. The signals from registers 420 and 452 are provided onto the cycle 1 feedback and cycle 2 feedback paths, respectively, on lines 237 and 238 respectively. The cycle 1 selection and cycle 2 selection control signals are further provided to selectors 192 and 194, respectively, causing the selectors to select the feedback paths on lines 237 and 238 respectively, so that the flush address is presented to the memory interface on line 264 along with the flush data provided on a data path (not shown). The flush data is written back to the shared main memory 54. When the pointer to the IP2 read address causes segment priority logic 220 to re-select the IP2 read address for presentation to the memory interface 264, the most recent copy of the data will now be available because the flush operation has occurred.

In sum, the above-described conflict detection system provides a memory request queue which uses pointers instead of memory addresses to queue requests to be presented from a cache memory to a main memory following a cache miss situation. This saves a significant amount of silicon area on logic designs implemented using custom chips. The improved conflict detection system also provides a queue entry for every request that could be pending simultaneously in the system at once. This allows the cache memory to continue processing requests that result in cache hits instead of cache misses, thereby significantly improving throughput. Finally, the system provides full address compare to eliminate the detection of false conflicts.

Having described an exemplary embodiment of the invention in the drawings and accompanying description, those skilled in the art will recognize that various modifications to the exemplary embodiment could be made without departing from the scope and spirit of the claims set forth below:

We claim:

1. For use in a data processing system in which multiple requesters are each coupled to a first memory for requesting access to the first memory at a request address and wherein ones of the multiple requesters can come in conflict by attempting to gain access to the same request address, the data processing system further having memory priority logic coupled to each of the multiple requesters and to the first memory for selecting ones of the request addresses to be provided to the first memory, wherein the first memory determines whether each of the selected ones of the request addresses is a non-resident request address which is not resident within the first memory, the data processing system further having a second memory coupled to the memory priority logic, an improved conflict detection system, comprising:

pointer generation means coupled to each of the multiple requesters for generating pointer signals indicative of a selected one of the multiple requesters requesting a selected one of the request addresses;

pointer queue means coupled to the first memory and to said pointer generation means for storing said pointer signals indicative of ones of the multiple requesters requesting non-resident request addresses; and queue priority means coupled to said pointer queue means and to the memory priority logic for selecting from said pointer queue means predetermined ones of said stored pointer signals, and for providing said pointer signals to the memory priority logic, whereby the memory priority logic provides to the second memory a non-resident request address from one of the multiple requesters as indicated by said selected ones of said stored pointer signals.

2. The improved conflict detection system of claim 1, and further including:

front-end compare means coupled to each of the multiple requesters for receiving each of the request addresses and coupled to the memory priority logic for receiving each of the selected ones of the request addresses, said front-end compare means for providing front-end conflict signals if a conflicting one of the selected ones of the request addresses has a predetermined relationship to any conflicting one of the request addresses; and compare validation means coupled to said front-end compare means for receiving said front-end conflict signals, and further coupled to said pointer queue means for receiving said stored pointer signals, said compare validation means for providing a valid conflict signal to said pointer queue means if said stored pointer signals are indicative of one of the multiple requesters requesting any said conflicting one of the request addresses, whereby said pointer signals indicative of the requester requesting the selected one of the request addresses are stored as conflict pointer signals, and whereby said queue priority means selects said conflict pointer signals from said pointer queue means to provide to the memory priority logic to cause the selected one of the request addresses to be provided from the one of the multiple requesters indicated by said selected conflict pointer signals to the first memory.

3. The improved conflict detection system of claim 1, and further including:

storage means coupled to the memory priority logic for storing as a replacement address a selected one of the request addresses that is a non-resident request address; and replacement compare means coupled to said pointer generation means, and coupled to said storage means for receiving said replacement address, said replacement compare means further coupled to the memory priority logic for receiving other selected ones of the request addresses and for providing a replacement conflict signal to said pointer generation means if any of the said other selected ones of the request addresses is a conflicting request address having a predetermined relationship to said replacement address, whereby said pointer generation means generates pointer signals which are conflict pointer signals indicative of the requester requesting said conflicting request address, whereby said pointer queue means stores said conflict pointer signals, and whereby said queue priority means selects said conflict pointer signals from said pointer queue means to provide to the memory priority logic to cause said conflicting request addresses to be provided from the one of the multiple requesters indicated by said selected conflict pointer signals to the first memory.

4. The improved conflict detection system of claim 1, wherein each of the request addresses is comprised of set address signals and block address signals, and further including:

storage means coupled to the memory priority means for receiving the set address signals of a selected one of the request addresses that is a non-resident request address as the flush set address, said storage means further coupled to the first memory for receiving predetermined signals as a flush block address, and for storing said flush set address and said flush block address as said flush address; and flush compare means coupled to said pointer generation means, and coupled to said storage means for receiving said flush address, said flush compare means further coupled to the memory priority logic for receiving other selected ones of the request addresses and for providing a flush conflict signal to said pointer generation means if any of the said other selected ones of the request addresses is a conflicting request address having a predetermined relationship to said flush address, whereby said pointer generation means generates pointer signals which are conflict pointer signals indicative of the requester requesting said conflicting request address, whereby said pointer queue means stores said conflict pointer signals, and whereby said queue priority means selects said conflict pointer signals from said pointer queue means to provide to the memory priority logic to cause said conflicting request address to be provided from the one of the multiple requesters indicated by said selected conflict pointer signals to the first memory.

5. The improved conflict detection system of claim 1, and further including:

first storage means coupled to the memory priority logic for storing address signals associated with a first selected one of the request addresses;

second storage means coupled to the memory priority logic for storing address signals associated with a second selected one of the request addresses; and immediate compare means coupled to said first storage means, to said second storage means, and to said pointer generation means for providing an immediate conflict signal to said pointer generation means if said first selected one of the request addresses and said second selected one of the request addresses have a predetermined relationship, said immediate conflict signal for causing said pointer generation means to generate pointer signals which are conflict pointer signals indicative of the requester requesting said second selected one of the request addresses, whereby said pointer queue means stores said conflict pointer signals, and whereby said queue priority means selects said conflict pointer signals from said pointer queue means to provide to the memory priority logic to cause the requester requesting said second selected one of the request addresses to provide said second selected one of the request addresses to the first memory.

6. The improved conflict detection system of claim 1, wherein said pointer queue means includes means for simultaneously storing pointer signals indicative of each of the multiple requesters.

7. The improved conflict detection system of claim 1, and further including request storage means coupled to each of the multiple requesters for storing a plurality of request addresses, and whereby said plurality of request addresses is made available to the memory priority logic at one time, and wherein said pointer signals are indicative of one of the plurality of request addresses from one of the multiple requesters.

8. For use in a data processing system, memory priority logic coupled to multiple requesters and to a first memory to receive one or more request signals from each of the multiple requesters, wherein each of the request signals is associated with a stored memory address provided by one of the requesters, and wherein ones of the multiple requesters can come in conflict by providing the same stored memory address, the memory priority logic to select as selected request signals ones of the multiple request signals to be provided to the first memory, the first memory to detect for each of the selected request signals whether the associated stored memory address is a nonresident address which is not resident within the first memory, the first memory being further coupled to a second memory, the improved conflict and detection system, comprising:

pointer generation logic coupled to each of the multiple requesters to receive the one or more request signals from each of the multiple requesters, and to generate for each of the selected request signals associated pointer signals pointing to the associated stored memory address;

a pointer queue coupled to the first memory and to said pointer generation logic to stores said pointer signals for each of the selected request signals if said associated selected request signals is associated with a non-resident address; and queue priority logic coupled to said pointer queue and to the memory priority logic to select from said pointer queue based on a predetermined priority scheme ones of said stored pointer signals as selected pointer signals, and to provide to the memory priority logic said selected pointer signals, whereby the memory priority logic, based on a second predetermined priority scheme, provides the stored memory address associated with said selected pointer signals to the second memory.

9. The improved conflict detection system of claim 8, and further including compare circuits coupled to said pointer queue logic to tag predetermined ones of said pointer signals as conflict-tagged pointer signals, and wherein upon receipt by the memory priority logic, said conflict-tagged pointer signals cause the memory priority logic to provide the stored memory address associated with said conflict-tagged pointer signals to the first memory instead of to the second memory.

10. The improved conflict detection system of claim 9, and further including:

front-end compare logic coupled to each of the multiple requesters to receive each of the stored memory addresses and further coupled to the memory priority logic to receive ones of the selected request signals, said front-end compare logic to provide front-end conflict signals for each of the selected request signals which is associated with a stored memory address which has a predetermined relationship to any of the other ones of the stored memory addresses, said front-end conflict signals to identify as conflicting addresses said other ones of the stored memory addresses having said predetermined relationship;

conflict validation logic coupled to said front-end compare logic to receive said front-end conflict signals and further coupled to said pointer queue to receive said stored ones of said pointer signals, and to provide to said pointer generation logic a valid conflict signal if any of said conflicting addresses are associated with any of said stored pointer signals, and if so, to provide to said pointer queue as conflict-tagged pointer signals said pointer signals pointing to the stored memory address associated with the selected request.

11. The improved conflict detection system of claim 9, and further including:

a storage device coupled to the memory priority logic to store as a replacement address a predetermined stored memory address associated with said selected pointer signals, said predetermined stored memory address being a non-resident address; and replacement compare logic coupled to said pointer generation logic, and coupled to said storage device to receive said replacement address, said replacement compare logic further coupled to the memory priority logic to receive other selected request signals, said replacement compare logic to provide replacement conflict signals to identify any of the stored memory addresses associated with said other selected request signals having a predetermined relationship to said replacement address, wherein said pointer generation logic is coupled to said replacement compare logic to receive said replacement conflict signals and is further coupled to said pointer queue to provide to said pointer queue said conflict-tagged pointer signals for each of said identified stored memory addresses associated with said other selected request signals.

12. The improved conflict detection system of claim 9 wherein each of the stored memory addresses is comprised of set address signals and block address signals, and further including:

a storage device coupled to the memory priority logic and to the first memory to store said set address signals of the stored memory address that is a non-resident address and is associated with one of the selected request signals, said storage device to further store block address signals received from the first memory, said stored set address and block address signals being the flush address; and flush compare logic coupled to said pointer generation logic, and coupled to said storage device to receive said flush address, said flush compare logic further coupled to the memory priority logic to receive other selected request signals, said flush compare logic to provide flush conflict signals to identify any of the stored memory addresses associated with said other selected request signals having a predetermined relationship to said flush address, wherein said pointer generation logic is coupled to said flush compare logic to receive said flush conflict signals and is further coupled to said pointer queue to provide to said pointer queue said conflict-tagged pointer signals for each of said identified stored memory addresses associated with said other selected request signals.

13. The improved conflict detection system of claim 9, and further including:

a first device coupled to the memory priority logic to store as the first immediate address a stored memory address associated with a first one of the selected request signals;

a second device coupled to the memory priority logic to store as the second immediate address a stored memory address associated with a second one of the selected request signals selected following the selection of said first one of the selected request signals; and immediate compare logic coupled to said pointer generation logic, coupled to said first storage device to receive said first immediate address, said immediate compare logic further coupled to said second storage device to receive said second immediate address, said immediate compare logic to provide immediate conflict signals if said first immediate address and said second immediate address have a predetermined relationship, and to provide to said pointer generation logic immediate conflict signals, whereby said pointer generation logic provides to said pointer queue said conflict-tagged pointer signals pointing to said stored memory address associated with said second one of the selected request signals.

14. The improved conflict detection system of claim 8, wherein said pointer queue is capable of simultaneously storing pointer signals associated with each of the stored memory addresses.

15. The improved conflict detection system of claim 8, wherein each of the multiple requesters provides one read request signal and one write request signal.

16. For use in a system having a plurality of storage devices coupled to a first memory, the first memory being coupled to an associated tag memory for providing tag signals indicative of the addresses resident within the first memory, each of the plurality of storage devices for presenting an associated stored memory address to the first memory for processing, and wherein ones of the storage devices can come in conflict by presenting the same stored memory address, the first memory further being coupled to a second memory, the improved conflict detection system, comprising:

priority means coupled to each of the plurality of storage devices for receiving each of the associated stored memory addresses, and for selecting ones of the associated stored memory addresses as selected addresses to be presented to the first memory;

pointer generation means for generating pointer signals associated with each of said selected addresses and indicative of the associated storage device;

queue means for storing said pointer signals for each of said associated selected addresses which is as non-resident address that is not resident within the first memory, wherein said queue means is capable of storing ones of said pointer signals for every storage device in the system; and queue priority means for selecting predetermined ones of said stored pointer signals as said selected pointer signals for presentation to said priority means, whereby said priority means provides the stored memory address from the storage device indicated by said selected pointer signals to the second memory.

17. The improved conflict detection system of claim 16, wherein said pointer generation means tags predetermined ones of said pointer signals as conflict pointer signals, and whereby upon receipt of said pointer signals that are said conflict pointer signals, said priority means provides the stored memory address from the storage device indicated by said conflict pointer signals to the first memory.

18. The improved conflict detection system of claim 17, and further including:

front-end compare means coupled to each of the plurality of storage devices for receiving each of the associated stored memory addresses, said front-end conflict signal for identifying as conflicting ones any of the associated stored memory addresses having a predetermined relationship to said selected address; and conflict validation means for tagging as said conflict pointer signals said pointer signals associated with said selected address if said identified conflicting ones of the associated stored memory addresses are associated with said stored pointer signals.

19. The improved conflict detection system of claim 17, and further including:

replace storage means for storing as the replacement address the stored memory address associated with said selected pointer signals if said stored memory address is one of said nonresident memory addresses and said replace storage means is not storing a different said replacement address;

replace compare means for receiving said selected addresses and for providing replacement conflict signals associated with each of said selected addresses that has a predetermined relationship to said replacement address; and wherein said pointer generation means is further for receiving said replacement conflict signals and for generating conflict pointer signals for said associated selected address, said conflict pointer signals to be stored by said pointer queue means.

20. The improved conflict detection system of claim 19, and further including:

flush storage means for receiving a predetermined portion of said replacement address as the flush set address, and for further receiving tag signals provided from said replacement address in the tag memory as the flush block address, and for storing said flush set address and said flush block address as said flush address;

flush compare means for receiving said selected addresses and for providing flush conflict signals associated with each of said selected addresses that have a predetermined relationship to said replacement address; and wherein said pointer generation means is further for receiving said flush conflict signals and for generating conflict pointer signals for said associated selected address, said conflict pointer signals to be stored by said pointer queue means.

21. The improved conflict detection system of claim 17, and further including:

first immediate storage means for storing a first one of said selected addresses as the first immediate address;

second immediate storage means for storing a second one of said selected addresses as the second immediate address;

immediate compare means for receiving said first immediate address and said second immediate address and for providing immediate conflict signals associated with said second immediate address if said second immediate address has a predetermined relationship to said first immediate address; and wherein said pointer generation means is further for receiving said immediate conflict signals and for generating conflict pointer signals for said second immediate address, said conflict pointer signals to be stored by said pointer queue means.

* * * * *